United States Patent
Aratani

(10) Patent No.: US 11,572,447 B2
(45) Date of Patent: Feb. 7, 2023

(54) RESIN MOLDED BODY PRODUCTION METHOD

(71) Applicant: Asahi Kasei Kabushiki Kaisha, Tokyo (JP)

(72) Inventor: Ryoko Aratani, Tokyo (JP)

(73) Assignee: Asahi Kasei Kabushiki Kaisha, Tokyo (JP)

(*) Notice: Subject to any disclaimer, the term of this patent is extended or adjusted under 35 U.S.C. 154(b) by 0 days.

(21) Appl. No.: 17/613,198

(22) PCT Filed: May 27, 2020

(86) PCT No.: PCT/JP2020/020962
§ 371 (c)(1),
(2) Date: Nov. 22, 2021

(87) PCT Pub. No.: WO2020/241707
PCT Pub. Date: Dec. 3, 2020

(65) Prior Publication Data
US 2022/0315714 A1 Oct. 6, 2022

(30) Foreign Application Priority Data
May 28, 2019 (JP) .............................. JP2019-099379

(51) Int. Cl.
| | |
|---|---|
| *C08J 3/20* | (2006.01) |
| *B29B 7/90* | (2006.01) |
| *B29B 7/60* | (2006.01) |
| *B29B 7/00* | (2006.01) |
| B29K 401/00 | (2006.01) |
| *B29B 7/48* | (2006.01) |
| *B29B 7/72* | (2006.01) |
| *B29B 7/82* | (2006.01) |
| *B29K 77/00* | (2006.01) |
| *B29K 105/16* | (2006.01) |

(52) U.S. Cl.
CPC .............. *C08J 3/203* (2013.01); *B29B 7/007* (2013.01); *B29B 7/60* (2013.01); *B29B 7/90* (2013.01); *B29B 7/48* (2013.01); *B29B 7/726* (2013.01); *B29B 7/823* (2013.01); *B29K 2077/00* (2013.01); *B29K 2105/162* (2013.01); *B29K 2401/00* (2013.01); *C08J 2323/12* (2013.01); *C08J 2377/02* (2013.01); *C08J 2401/02* (2013.01)

(58) Field of Classification Search
CPC .... C08J 3/203; C08J 2323/12; C08J 2377/02; C08J 2401/02; B29B 7/007; B29B 7/60; B29B 7/90; B29B 7/48; B29B 7/726; B29B 7/823; B29K 2077/00; B29K 2105/162; B29K 2401/00
See application file for complete search history.

(56) References Cited

U.S. PATENT DOCUMENTS

| | | | |
|---|---|---|---|
| 2013/0030090 | A1 | 1/2013 | Nakai et al. |
| 2016/0168363 | A1 | 6/2016 | Nelson et al. |
| 2017/0001336 | A1 | 1/2017 | Tamai et al. |
| 2018/0037737 | A1 | 2/2018 | Semba et al. |
| 2021/0024722 | A1 | 1/2021 | Fujihashi et al. |
| 2022/0203585 | A1* | 6/2022 | Tanimoto ................. C08K 7/02 |

FOREIGN PATENT DOCUMENTS

| | | |
|---|---|---|
| CN | 105960315 A | 9/2016 |
| JP | H09-059421 A | 3/1997 |
| JP | 2004-195890 A | 7/2004 |
| JP | 2011-182875 A | 9/2011 |
| JP | 2012-007097 A | 1/2012 |
| JP | 2012-201767 A | 10/2012 |
| JP | 2012-251039 A | 12/2012 |
| JP | 2014-512283 A | 5/2014 |
| JP | 2016-014117 A | 1/2016 |
| JP | 2016-176052 A | 10/2016 |
| JP | 2017-095714 A | 6/2017 |
| JP | 2017-538003 A | 12/2017 |

(Continued)

OTHER PUBLICATIONS

Work for Performance Evaluation Project of the Cellulose Nanofiber Recycle (2017), "Development of high-speed sorting and high-strength-imparting processing methods for cellulose nanofiber composite resins" (Mar. 1, 2018) (see English abstract on p. 7 and partial English translation).
International Preliminary Report on Patentability and Written Opinion issued in corresponding International Patent Application No. PCT/JP2020/020962 dated Dec. 9, 2021.
Work for Performance Evaluation Project of the Cellulose Nanofiber (2016) (Mar. 1, 2017)Summary (pp. 6 to 12) & Partial translation.
Work for Performance Evaluation Project of the Cellulose Nanofiber-Utilizing Product (2015) (Mar. 31, 2016) Summary (in Original Document) & Partial translation.

(Continued)

*Primary Examiner* — Edward J Cain
(74) *Attorney, Agent, or Firm* — Morgan, Lewis & Bockius LLP

(57) ABSTRACT

Provided is a resin molded body production method that enables production of a resin molded body in which mechanical strength is good, anisotropy of physical properties is low, and little warpage is developed. This production method is for a resin molded body containing a thermoplastic resin (A) and a cellulose nanofiber (B), the production method including: a step for preparing a main supply material (a1) containing the thermoplastic resin (A) and the cellulose nanofiber (B) and an auxiliary supply material (a2) that is a product of melting treatment of the main supply material (a1); a resin composition formation step for obtaining a resin composition (b) by melting and mixing of the main supply material (a1) and the auxiliary supply material (a2); and a step for obtaining the resin molded body by molding the resin composition (b).

19 Claims, 2 Drawing Sheets

(56) References Cited

FOREIGN PATENT DOCUMENTS

| JP | 2018-016745 A | 2/2018 |
|----|---------------|--------|
| JP | 2019-006997 A | 1/2019 |
| WO | 2011/126038 A1 | 10/2011 |
| WO | 2012/138473 A1 | 10/2012 |
| WO | 2016/102341 A1 | 6/2016 |
| WO | 2017/141779 A1 | 8/2017 |

OTHER PUBLICATIONS

Notice of Reasons for Refusal issued in corresponding Japanese Patent Application No. 2019-099379 dated Jan. 28, 2020.
Cellulose Nanofiber (CNF) Reinforced Polyamide 6 Resin (Development Article)(Apr. 2017) (see partial English translation).
International Search Report issued in corresponding International Patent Application No. PCT/JP2020/020962 dated Aug. 18, 2020.
Decision to Grant issued in corresponding Japanese Patent Application No. 2019-099379 dated Aug. 4, 2020.

\* cited by examiner

RESIN MOLDED BODY PRODUCTION METHOD

FIELD

The present invention relates to a method for producing a resin molded body that includes a thermoplastic resin and cellulose nanofibers.

BACKGROUND

Thermoplastic resins are light and have excellent processing characteristics, and are therefore widely used for a variety of purposes including automobile members, electrical and electronic parts, business machine housings and precision parts. With resins alone, however, the mechanical properties, slidability, thermal stability and dimensional stability are often inadequate, and it is common to use composites of resins with different types of inorganic materials.

Resin compositions comprising thermoplastic resins reinforced with reinforcing materials consisting of inorganic fillers such as glass fibers, carbon fibers, talc or clay have high specific gravity, and therefore the obtained resin molded bodies have higher weight. In recent years, cellulose has come to be used as a new reinforcing material for resins because of its lower environmental burden.

In terms of simple properties, cellulose is known to have a high elastic modulus similar to aramid fibers, and a lower linear expansion coefficient than glass fibers. In addition, it exhibits a low true density of 1.56 $g/cm^3$, which is overwhelmingly lighter than glass (density: 2.4 to 2.6 $g/cm^3$) or talc (density: 2.7 $g/cm^3$) which are used as common reinforcing materials for thermoplastic resins.

Cellulose is obtained from a variety of sources, including trees as starting materials, as well as hemp, cotton, kenaf and cassava starting materials. Bacterial celluloses are also known, typical of which is nata de coco. These natural resources that are useful as starting materials are abundant throughout the Earth, and a great deal of effort has been focused on techniques for exploiting cellulose as fillers in resins in a manner so that they can be effectively utilized.

CNF (cellulose nanofibers) are obtained using pulp or the like as starting material, hydrolyzing the hemicellulose portion to weaken the pulp, and then defibrating it using a pulverizing method with a high-pressure homogenizer, microfluidizer, ball mill or disk mill, and in water they form a highly dispersed state and network on a level known as a fine nanodispersion.

For distribution of CNF in a resin it is necessary to dry the CNF into a powder form, but with CNF it has been a problem that they change from a microdispersed state to firm aggregates during the course of separation from water, making their redispersion difficult. Aggregating force is exhibited due to hydrogen bonding by the hydroxyl groups of the cellulose, and it is considered to be extremely strong.

In order to adequately exhibit the performance of CNF, therefore, it is necessary to relax hydrogen bonding by the hydroxyl groups of the cellulose. Even when relaxation of hydrogen bonding is achieved, however, it is still difficult to maintain a disentangled state (nanometer size, or <1 µm) in the resin.

PTL 1 describes a fiber-reinforced resin composition comprising (A) chemically modified cellulose nanofibers and (B) a thermoplastic resin, wherein the chemically modified cellulose nanofibers and thermoplastic resin satisfy the following conditions: (a) the ratio R ($SP_{cnf}/SP_{pol}$), between the solubility parameter ($SP_{cnf}$) of the chemically modified cellulose nanofibers (A) and the solubility parameter ($SP_{pol}$) of the thermoplastic resin (B), is in the range of 0.87 to 1.88, and (b) the degree of crystallinity of the chemically modified cellulose nanofibers (A) is 42.7% or greater.

CITATION LIST

Patent Literature

[PTL 1] Japanese Unexamined Patent Publication No. 2016-176052

SUMMARY

Technical Problem

The technology described in PTL 1 is intended to provide a fiber-reinforced resin composition in which cellulose nanofibers are satisfactorily dispersed by a suitable combination of fibers with improved dispersibility and a resin that is easily dispersible in the fibers, and the technology can potentially increase the dispersibility of cellulose nanofibers to some degree. However, when cellulose nanofibers are chemically and/or physically treated in order to improve the dispersibility of the cellulose nanofibers in a resin composition, this causes deterioration of the cellulose nanofibers, making it impossible to obtain a reinforcing effect by the cellulose nanofibers.

Cellulose nanofibers with large fiber lengths have an excellent reinforcing effect, and when they are present in a resin composition they can impart satisfactory mechanical strength to the resin composition. However, since large-fiber length cellulose nanofibers tend to become oriented in the resin composition, they can result in anisotropy of the physical properties (such as molding shrinkage or thermal expansion coefficient) of the resin composition (i.e. differences in the physical properties depending on the direction). Such anisotropy is known to cause warping during the shaping of large-sized molded articles.

Means for inhibiting anisotropy include microdispersion of the cellulose nanofibers in the resin, for example. To achieve such microdispersion it is common to employ a method of applying strong shear using a twin-screw extruder or multi-screw extruder, for example. However, it has become a problem in recent years that such methods cause significant discoloration of cellulose due to its strong thermal history, resulting in an excessively colored molded article. Processing with an extruder is known to result in short pass in a certain percentage of cases, so that it becomes impossible to achieve adequate dispersion with kneading alone, and the resulting composition includes a mixture of large huge aggregated masses (specifically with diameters of 5 µm or greater, or several hundred µm or greater in some cases). Cellulose nanofibers that have been subjected to powerful shear, on the other hand, also exhibit problems of notably reduced tensile strength or surface impact strength, for example, presumably due to their short fiber lengths.

Thus, the prior art technologies have not been able to yield a cellulose nanofiber-containing resin composition having satisfactory mechanical strength and a low degree of anisotropy of physical properties or warping, as well as reduced heat-induced coloration.

It is an object of the present invention to solve this problem by providing a method for producing a resin molded body which makes it possible to produce a resin molded body that includes cellulose nanofibers, has satisfactory mechanical strength and a low degree of anisotropy of physical properties and warping, and exhibits reduced heat-induced coloration.

Solution to Problem

As a result of diligent research directed toward solving the problems described above, the present inventors have completed this invention upon finding that the aforementioned problem can be solved by subjecting cellulose nanofibers to a special manner of thermal history during production of a resin molded body containing cellulose nanofibers.

Specifically, the present invention encompasses the following aspects.

[1] A method for producing a resin molded body that includes a thermoplastic resin (A) and cellulose nanofibers (B), wherein the method includes:

a step of preparing a main supply material (a1) that includes the thermoplastic resin (A) and the cellulose nanofibers (B), and an auxiliary supply material (a2) which is the product of melting treatment of the main supply material (a1), and a resin composition-forming step of melt mixing the main supply material (a1) and the auxiliary supply material (a2) to obtain a resin composition (b), and a step of molding the resin composition (b) to obtain a resin molded body.

[2] A method for increasing defibration of cellulose nanofibers (B) during production of a resin molded body that includes a thermoplastic resin (A) and cellulose nanofibers (B), wherein the method includes:

a step of preparing a main supply material (a1) that includes the thermoplastic resin (A) and the cellulose nanofibers (B), and an auxiliary supply material (a2) which is the product of melting treatment of the main supply material (a1), a resin composition-forming step of melt mixing the main supply material (a1) and the auxiliary supply material (a2) to obtain a resin composition (b) that includes two or more types of cellulose nanofibers with different thermal histories, and a step of molding the resin composition (b) to obtain a resin molded body.

[3] The method according to aspect 2, wherein the two or more types of cellulose nanofibers with different thermal histories have different fiber lengths.

[4] The method according to any one of aspects 1 to 3, wherein a portion of the resin molded body is used as the auxiliary supply material (a2).

[5] The method according to any one of aspects 1 to 4, wherein the main supply material (a1) includes the thermoplastic resin (A) at 100 parts by mass and the cellulose nanofibers (B) at 1 to 50 parts by mass.

[6] The method according to any one of aspects 1 to 5, wherein the constituent components of the main supply material (a1) are mixed together and with the auxiliary supply material (a2) in a melt mixing system.

[7] The method according to any one of aspects 1 to 6, wherein the main supply material (a1) is a combination of a first material as a molded article that includes the thermoplastic resin (A) at 100 parts by mass and the cellulose nanofibers (B) at 1 to 50 parts by mass, and a second material with a different composition than the first material.

[8] The method according to any one of aspects 1 to 7, wherein the melt mixing is carried out with the blending ratio of the auxiliary supply material (a2) at 5 to 50 mass % with respect to 100 mass % as the total of the main supply material (a1) and the auxiliary supply material (a2).

[9] The method according to any one of aspects 1 to 8, wherein the melt mixing is melt kneading.

[10] The method according to any one of aspects 1 to 9, wherein the resin molded body is in the form of pellets.

[11] The method according to aspect 10, wherein the melt mixing is melt kneading, and the melt kneading and molding are carried out in a single kneader.

[12] The method according to any one of aspects 1 to 11, wherein the TD/MD ratio for molding shrinkage of the resin molded body is 1.05 to 3.0.

[13] The method according to any one of aspects 1 to 12, wherein in the resin molded body, the molding shrinkage in the MD direction is 0.2% to 1.2% and the molding shrinkage in the TD direction is 0.5% to 1.2%.

[14] The method according to any one of aspects 1 to 13, wherein the TD/MD ratio (Rb) for molding shrinkage of the resin molded body and the TD/MD ratio (Ra1) for molding shrinkage of a comparison resin molded body, that has been molded under the same conditions as the resin molded body except for molding only the main supply material (a1) instead of the resin composition (b), are in the relationship represented by the following formula:

$$[Rb]<[Ra1].$$

[15] The method according to any one of aspects 1 to 14, wherein the resin molded body has a tensile strength of 90 MPa or greater.

[16] The method according to any one of aspects 1 to 15, wherein the elastic modulus of the main supply material (a1) and the elastic modulus of the resin composition (b) satisfy the relationship represented by the following formula:

[Elastic modulus of resin composition (b)] [Elastic modulus of main supply material (a1)×0.99].

[17] The method according to any one of aspects 1 to 16, wherein the method further includes returning a portion of the resin molded body back to the resin composition-forming step as at least part of the auxiliary supply material (a2), so that the resin molded body includes cellulose nanofibers that have passed through melting treatment of the main supply material (a1) and at least two resin composition-forming steps, and the percentage of the cellulose nanofibers that have passed through melting treatment of the main supply material (a1) and at least two resin composition-forming steps is 20 mass % or lower with respect to 100 mass % as the total amount of the cellulose nanofibers in the resin molded body.

[18] The method according to any one of aspects 1 to 17, wherein the difference between the value of the yellowness index (YI) of the resin molded body and the value of the yellowness index (YI) of the auxiliary supply material is 10 or less.

[19] The method according to any one of aspects 1 to 18, wherein the thermoplastic resin (A) is a polyamide.

[20] The method according to any one of aspects 1 to 19, wherein the cellulose nanofibers (B) are modified cellulose nanofibers.

[21] The method according to aspect 20, wherein the degree of substitution of the modified cellulose nanofibers is 0.5 to 1.5.

Advantageous Effects of Invention

According to the invention there is provided a method for producing a resin molded body which makes it possible to produce a resin molded body that includes cellulose nanofibers, has satisfactory mechanical strength and a low degree of anisotropy of physical properties and warping, and exhibits reduced heat-induced coloration.

DESCRIPTION OF EMBODIMENTS

Figure 1:
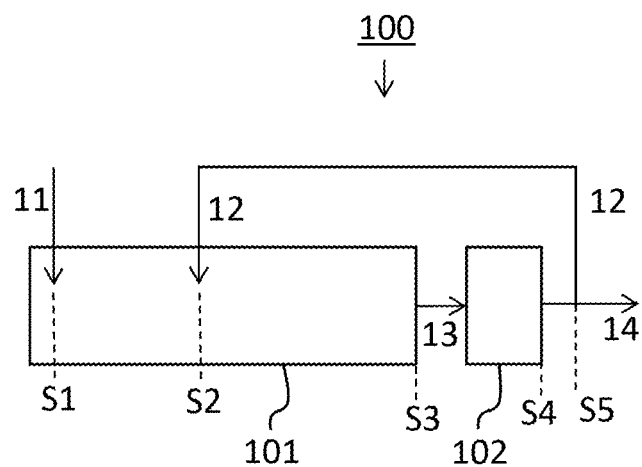
FIG. 1 is a diagram illustrating a process 100 which is an example of the method for producing a resin molded body according to a first embodiment of the invention.

Exemplary modes of the present invention will now be described, with the understanding that they are not limitative on the invention. Elements assigned with like reference numerals throughout the diagrams have the same construction and function.

<Production of Resin Molded Body>

One aspect of the invention provides a method for producing a resin molded body including a thermoplastic resin (A) and cellulose nanofibers (B). According to one aspect, the method includes a step of preparing a main supply material (a1) that includes the thermoplastic resin (A) and the cellulose nanofibers (B), and an auxiliary supply material (a2) which is the product of melting treatment of the main supply material (a1), a resin composition-forming step of melt mixing the main supply material (a1) and the auxiliary supply material (a2) to obtain a resin composition (b), and a step of molding the resin composition (b) to obtain a resin molded body.

Another aspect of the invention provides a method of increasing defibration of cellulose nanofibers (B) during production of a resin molded body that includes a thermoplastic resin (A) and the cellulose nanofibers (B). According to this aspect the method includes a step of preparing a main supply material that includes the thermoplastic resin (A) and the cellulose nanofibers (B), and an auxiliary supply material which is the product of melting treatment of the main supply material, a resin composition-forming step of melt mixing the main supply material and the auxiliary supply material to obtain a resin composition that includes two or more types of cellulose nanofibers with different thermal histories, and a step of molding the resin composition to obtain a resin molded body.

According to one aspect, the two or more types of cellulose nanofibers with different thermal histories have different fiber lengths. Since the auxiliary supply material has a more extensive thermal history than the main supply material, according to one aspect the fiber lengths of the cellulose nanofibers in the auxiliary supply material are smaller than the fiber lengths of the cellulose nanofibers in the main supply material.

According to the first embodiment, the resin molded body is a molten mixture of the constituent components of the main supply material (specifically the thermoplastic resin (A), the cellulose nanofibers (B) and optional additional components), and the auxiliary supply material. The resin molded body produced by the first embodiment may typically be provided in the form of pellets.

According to the second embodiment, the resin molded body is a molten mixture comprising a molten mixture that includes a thermoplastic resin (A), cellulose nanofibers (B) and optional additional components (first material), and a second material having a different composition. According to one aspect, the first material may be a resin molded body obtained by the first embodiment. The resin molded body produced by the second embodiment may typically be provided in the form of pellets, or in various molded product forms.

[Constituent Components of Main Supply Material and Auxiliary Supply Material]

The main supply material (a1) may be in the form of a mixture that includes the thermoplastic resin (A), the cellulose nanofibers (B) and optional additional components, and it may have the constituent components of the main supply material (i.e. the thermoplastic resin (A), cellulose nanofibers (B) and optional additional components) prepared separately. The auxiliary supply material is the product of melting treatment of the main supply material. The auxiliary supply material therefore has substantially the same composition as the main supply material (that is, the types and amounts of the constituent components are the same), but it may also have at least some of the constituent components of the main supply material modified by the melting treatment. Such modification includes reduced fiber lengths of the cellulose nanofibers (B).

Since the auxiliary supply material (a2) has essentially the same composition as the main supply material, it mixes very satisfactorily with the supplied materials. Since the fiber lengths of the cellulose nanofibers in the main supply material of the auxiliary supply material are reduced, the cellulose nanofibers derived from the main supply material (having relatively large fiber lengths) and the cellulose nanofibers derived from the auxiliary supply material (having relatively small fiber lengths) become mixed in the mixture of the main supply material and auxiliary supply material. Increasing the cellulose nanofiber lengths increases the mechanical strength of the resin molded body while reducing the flow property of the resin composition during production of the resin molded body, tending to result in reduced dispersibility of the cellulose nanofibers in the resin molded body and greater anisotropy of the physical properties (such as thermal expansion coefficient) of the resin molded body (for example, differences in the directions corresponding to the MD direction and TD direction during production of the resin molded body). Since the mechanical strength is significantly affected by the presence of cellulose nanofibers with large fiber lengths, it is notably increased even by using a relatively small amount of cellulose nanofibers with large fiber lengths. The extent of the effect of the presence of cellulose nanofibers with large fiber lengths on the anisotropy of physical properties and the dispersibility, is not as notable as the effect on the mechanical strength. Therefore, a resin molded body obtained using a mixture of the main supply material and auxiliary supply material has a satisfactory degree of mechanical strength provided mainly by the presence of cellulose nanofibers with large fiber lengths, but a satisfactory effect of reduced anisotropy of physical properties and increased dispersibility is also obtained by the co-presence of cellulose nanofibers with smaller fiber lengths. The resin molded body obtained by the method of the disclosure can thus provide a unique advantage of providing satisfactory mechanical strength, as well as both satisfactory dispersibility and low anisotropy. The shear exerted during the melting process for the auxiliary supply material produces crazing at the weakest locations of the structure, and specifically in the cellulose nanofiber aggregates present throughout the structure, which creates a synergistic effect due to thinner cellulose nanofiber aggregates and increased viscosity of the system, making it possible to significantly lower the amount of cellulose nanofiber aggregates that can form in the final molded article.

According to one aspect, the auxiliary supply material may be material that has been removed from a portion of the resin molded body and returned to the process. In addition, (1) the resin molded body obtained after starting production and until the process conditions stabilize for obtaining the desired resin molded body, (2) a resin molded body that has substantially the same composition but exhibits different physical properties from the physical properties of the desired resin molded body, or (3) a resin molded body having substantially the same composition as the desired resin molded body among the resin molded bodies obtained in a transient time period in which the composition is varied, may be used as the auxiliary supply material, within the acceptable ranges from the viewpoint of economy. To have "substantially the same composition" means that the amounts of the components of the resin molded body are within ranges of +5 mass % to −5 mass %. Specifically, if the content of the cellulose nanofibers (B) is 7.5 mass %, for example, then the range is 7.125 mass % to 7.875 mass %. A range of +5% to −5% is equivalent to variation in the composition that results during periodic addition (refilling) of material to the material supply apparatus of the kneader.

According to one aspect, from the viewpoint of satisfactorily obtaining an effect of improving the properties by the cellulose nanofibers (B) (for example, an effect of improving the mechanical strength, thermal stability and durability), the amount of cellulose nanofibers (B) in the main supply material is preferably 1 mass % or greater, more preferably 3 mass % or greater and even more preferably 5 mass % or greater, while from the viewpoint of satisfactory moldability and dispersibility, as well as low anisotropy, it is preferably 50 mass % or lower, more preferably 40 mass % or lower and even more preferably 20 mass % or lower.

Examples of constituent features of the main supply material (and the auxiliary supply material which has substantially the same composition) will now be described in detail.

<Thermoplastic Resin (A)>

Various types of resins may be used as the thermoplastic resin (A). According to one aspect, the thermoplastic resin (A) has a number-average molecular weight of 5000 or greater. The number-average molecular weight for the present disclosure is the value determined based on a chromatogram measured using GPC (gel permeation chromatography), in terms of a GPC standard polymer. The GPC standard polymer used may be a polymer that is known to those skilled in the art. Common examples include polystyrene, poly(methyl methacrylate), polyethylene glycol and polyethylene oxide. The standard polymer that is used is selected depending on the type of eluent used during GPC measurement. As examples, methyl polymethacrylate is used when the eluent is hexafluoroisopropanol, polystyrene is used when it is tetrahydrofuran, chloroform, toluene or 1,2,4-trichlorobenzene, and polyethylene glycol or polyethylene oxide is used for methanol, N,N-dimethylformamide or an aqueous system.

The thermoplastic resin (A) may be a crystalline resin with a melting point in the range of 100° C. to 350° C., or an amorphous resin with a glass transition temperature in the range of 100 to 250° C. The thermoplastic resin (A) may be constructed of one or more different polymers, which may be homopolymers or copolymers.

The melting point of the crystalline resin referred to here is the peak top temperature of the endothermic peak appearing when the temperature is increased from 23° C. at a temperature-elevating rate of 10° C./min using a differential scanning calorimeter (DSC). When two or more endothermic peaks appear, it represents the peak top temperature of the endothermic peak that is furthest at the high-temperature end. The enthalpy of the endothermic peak is preferably 10 J/g or greater and more preferably 20 J/g or greater. During the measurement, preferably the sample is heated once to temperature conditions of melting point +20° C. or higher, and after the resin has been melted, it is cooled to 23° C. at a temperature-lowering rate of 10° C./min and used as the sample.

The glass transition temperature of the amorphous resin referred to here is the peak top temperature of the peak with high reduction in storage modulus and maximum loss modulus, during measurement with an applied frequency of 10 Hz while increasing the temperature from 23° C. at a temperature-elevating rate of 2° C./min, using a dynamic viscoelasticity measuring apparatus. When two or more loss modulus peaks appear, it represents the peak top temperature of the peak that is furthest at the high-temperature end. The measuring frequency during this time is preferably at least one or more times in 20 seconds, in order to increase the measuring precision. The method of preparing the measuring sample is not particularly restricted, but from the viewpoint of eliminating the effect of molding strain it is preferred to use a strip cut out from a hot press molded article, the size (width or thickness) of the cut out strip preferably being as small as possible, from the viewpoint of heat conduction.

The thermoplastic resin (A) may be a polyamide-based resin, polyester-based resin, polyacetal-based resin, polycarbonate-based resin, polyacrylic-based resin, polyphenylene ether-based resin (including modified polyphenylene ethers modified by blending or graft polymerization of polyphenylene ether with other resins), polyallylate-based resin, polysulfone-based resin, polyphenylene sulfide-based resin, polyethersulfone-based resin, polyketone-based resin, polyphenylene ether ketone-based resin, polyimide-based resin, polyamideimide-based resin, polyetherimide-based resin, polyurethane-based resin or polyolefin-based resin (such as an α-olefin (co)polymer), or any of various ionomers.

These may be used alone or in combinations of two or more. When two or more are used in combination, they may be used as a polymer alloy. The thermoplastic resin used may be modified with one or more compounds selected from among unsaturated carboxylic acids and their acid anhydrides or derivatives.

From the viewpoint of heat resistance, moldability, design properties and mechanical properties, it is preferred to select one or more resins from the group consisting of polyolefin-based resins, polyamide-based resins, polyester-based resins, polyacetal-based resins, polyacrylic-based resins, polyphenylene ether-based resins and polyphenylene sulfide-based resins.

More preferred, from the viewpoint of handleability and cost, are one or more resins selected from the group consisting of polyolefin-based resins, polyamide-based resins, polyacetal-based resins and polyphenylene ether-based resins, and especially one or more resins selected from the group consisting of polyolefin-based resins and polyamide-based resins. As a particularly preferred aspect, the thermoplastic resin (A) is a polyamide.

The polyolefin-based resin is a polymer obtained by polymerizing a monomer unit that includes an olefin (such as an α-olefin). Specific examples of polyolefin-based resins include, but are not limited to, ethylene-based (co)polymers such as low-density polyethylene (for example, linear low-density polyethylene), high-density polyethylene, ultralow-density polyethylene and ultrahigh molecular weight polyethylene, polypropylene-based (co)polymers such as polypropylene, ethylene-propylene copolymer and ethylene-propylene-diene copolymer, and copolymers of α-olefins such as ethylene with other monomer units, including ethylene-acrylic acid copolymer, ethylene-methyl methacrylate copolymer and ethylene-glycidyl methacrylate copolymer.

The most preferred polyolefin-based resin is polypropylene. Particularly preferred is polypropylene, which has a melt mass-flow rate (MFR) of 3 g/10 min to 30 g/10 min, as measured at 230° C. with a load of 21.2 N, according to ISO1133. The lower limit for MFR is more preferably 5 g/10 min, even more preferably 6 g/10 min and most preferably 8 g/10 min. The upper limit for MFR is more preferably 25 g/10 min, even more preferably 20 g/10 min and most preferably 18 g/10 min. The MFR preferably is not above this upper limit from the viewpoint of increased toughness of the composition, and it is preferably not less than the lower limit from the viewpoint of the flow property of the composition.

An acid-modified polyolefin-based resin may also be suitably used in order to increase the affinity with cellulose. The acid may be appropriately selected from among maleic acid, fumaric acid, succinic acid, phthalic acid and their anhydrides, or polycarboxylic acids such as citric acid. Preferred among these are maleic acid or its anhydride, for an increased modification rate. While the modification method is not particularly restricted, a common method involves heating the resin to above the melting point in the presence or in the absence of a peroxide, for melt kneading. The polyolefin resin to be acid-modified may be any of the aforementioned polyolefin-based resins, but polypropylene is most suitable for use.

The acid-modified polyolefin-based resin may be used alone, but it is preferably used in admixture with a non-modified polyolefin-based resin in order to adjust the modification rate of the composition. For example, when using a mixture of a non-modified polypropylene and an acid-modified polypropylene, the proportion of the acid-modified polypropylene is preferably 0.5 mass % to 50 mass % with respect to the total polypropylene. The lower limit is more preferably 1 mass %, even more preferably 2 mass %, yet more preferably 3 mass %, even yet more preferably 4 mass % and most preferably 5 mass %. The upper limit is more preferably 45 mass %, even more preferably 40 mass %, yet more preferably 35 mass %, even yet more preferably 30 mass % and most preferably 20 mass %. In order to maintain interfacial strength with the cellulose it is preferably higher than the lower limit, and in order to maintain ductility as a resin it is preferably lower than the upper limit.

The lower limit for the acid modification rate of the acid-modified polyolefin-based resin is preferably 0.01 mass %, more preferably 0.1 mass %, even more preferably 0.3 mass %, especially preferably 0.5 mass % and most preferably 0.7 mass %. The upper limit is preferably 10 mass %, more preferably 5 mass %, even more preferably 3 mass %, especially preferably 2 mass % and most preferably 1.5 mass %. In order to maintain interfacial strength with the cellulose it is preferably higher than the lower limit, and in order to maintain the mechanical properties of the acid-modified polyolefin it is preferably lower than the upper limit.

The melt mass-flow rate (MFR) of the acid-modified polypropylene as measured at 230° C. with a load of 21.2 N according to ISO1133 is preferably 50 g/10 min or higher, in order to increase affinity with the cellulose interface. A more preferred lower limit is 100 g/10 min, with 150 g/10 min being more preferred and 200 g/10 min being most preferred. There is no particular upper limit, and it may be 500 g/10 min in order to maintain mechanical strength. An MFR within this range will provide an advantage of residing more easily at the interface between the cellulose and the resin.

Examples of preferred polyamide-based resins for the thermoplastic resin include, but are not limited to, polyamide 6, polyamide 11 and polyamide 12 obtained by polycondensation reaction of lactams, or polyamide 6,6, polyamide 6,10, polyamide 6,11, polyamide 6,12, polyamide 6,T, polyamide 6,I, polyamide 9,T, polyamide 10,T, polyamide 2M5,T, polyamide MXD,6, polyamide 6,C or polyamide 2M5,C obtained as copolymers between diamines such as 1,6-hexanediamine, 2-methyl-1,5-pentanediamine, 1,7-heptanediamine, 2-methyl-1-6-hexanediamine, 1,8-octanediamine, 2-methyl-1,7-heptanediamine, 1,9-nonanediamine, 2-methyl-1,8-octanediamine, 1,10-decanediamine, 1,11-undecanediamine, 1,12-dodecanediamine and m-xylylenediamine, and dicarboxylic acids such as butanedioic acid, pentanedioic acid, hexanedioic acid, heptanedioic acid, octanedioic acid, nonanedioic acid, decanedioic acid, benzene-1,2-dicarboxylic acid, benzene-1,3-dicarboxylic acid, benzene-1,4-dicarboxylic acid, cyclohexane-1,3-dicarboxylic acid and cyclohexane-1,4-dicarboxylic acid, as well as copolymers obtained by copolymerizing the foregoing (examples of which include polyamide 6,T/6,I).

More preferred among these polyamide-based resins are aliphatic polyamides such as polyamide 6, polyamide 11, polyamide 12, polyamide 6,6, polyamide 6,10, polyamide 6,11 and polyamide 6,12, and alicyclic polyamides such as polyamide 6,C and polyamide 2M5,C.

There are no particular restrictions on the terminal carboxyl group concentration of the polyamide-based resin, but the lower limit is preferably 20 μmol/g and more preferably 30 μmol/g. The upper limit for the terminal carboxyl group concentration is preferably 150 μmol/g, more preferably 100 μmol/g and even more preferably 80 μmol/g.

In the polyamide-based resin, the ratio of carboxy-terminal groups with respect to the total terminal groups ([COOH]/[total terminal groups]) is more preferably 0.30 to 0.95. The lower limit for the carboxy-terminal group ratio is more preferably 0.35, yet more preferably 0.40 and most preferably 0.45. The upper limit for the carboxy-terminal group ratio is more preferably 0.90, even more preferably 0.85 and most preferably 0.80. The carboxy-terminal group ratio is preferably 0.30 or greater from the viewpoint of dispersibility of the cellulose nanofibers (B) in the resin composition, and it is preferably no greater than 0.95 from the viewpoint of the color tone of the obtained resin composition.

The method used to adjust the terminal group concentration of the polyamide-based resin may be a publicly known method. For example, the method may be addition of a terminal group adjuster that reacts with the terminal groups, such as a diamine compound, monoamine compound, dicarboxylic acid compound, monocarboxylic acid compound, acid anhydride, monoisocyanate, monoacid halide, monoester or monoalcohol, to the polymerization solution, so as to result in the prescribed terminal group concentration during polymerization of the polyamide.

Examples of terminal group adjusters that react with terminal amino groups include aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid and isobutyric acid; alicyclic monocarboxylic acids such as cyclohexanecarboxylic acid; aromatic monocarboxylic acids such as benzoic acid, toluic acid, α-naphthalenecarboxylic acid, β-naphthalenecarboxylic acid, methylnaphthalenecarboxylic acid and phenylacetic acid; and mixtures of any selected from among the foregoing. Among these, from the viewpoint of reactivity, stability of capped ends and cost, one or more terminal group adjusters selected from the group consisting of acetic acid, propionic acid, butyric acid, valeric acid, caproic acid, caprylic acid, lauric acid, tridecanoic acid, myristic acid, palmitic acid, stearic acid and benzoic acid are preferred, with acetic acid being most preferred.

Examples of terminal group adjusters that react with terminal carboxyl groups include aliphatic monoamines such as methylamine, ethylamine, propylamine, butylamine, hexylamine, octylamine, decylamine, stearylamine, dimethylamine, diethylamine, dipropylamine and dibutylamine; alicyclic monoamines such as cyclohexylamine and dicyclohexylamine; aromatic monoamines such as aniline, toluidine, diphenylamine and naphthylamine; and any mixtures of the foregoing. Among these, from the viewpoint of reactivity, boiling point, capped end stability and cost, it is preferred to use one or more terminal group adjusters selected from the group consisting of butylamine, hexylamine, octylamine, decylamine, stearylamine, cyclohexylamine and aniline.

The concentration of the amino terminal groups and carboxy-terminal groups is preferably determined from the integral of the characteristic signal corresponding to each terminal group, according to $^1$H-NMR, from the viewpoint of precision and convenience. The recommended method for determining the terminal group concentration is, specifically, the method described in Japanese Unexamined Patent Publication HEI No. 7-228775. When this method is used, heavy trifluoroacetic acid is useful as the measuring solvent. The number of scans in $^1$H-NMR must be at least 300, even with measurement using a device having sufficient resolving power. Alternatively, the terminal group concentration can be measured by a titration method such as described in Japanese Unexamined Patent Publication No. 2003-055549. However, in order to minimize the effects of the mixed additives and lubricant, quantitation is preferably by $^1$H-NMR.

The viscosity number [VN] of the polyamide-based resin, measured in 96% sulfuric acid according to ISO307, is preferably 60 to 300, more preferably 70 to 250, even more preferably 75 to 200 and especially preferably 80 to 180. The polyamide-based resin with a viscosity number in this range is advantageous in that it provides a satisfactory flow property in the die during injection molding of the resin composition to produce the resin molded body, allowing the resin molded body to have a satisfactory outer appearance.

Preferred polyester-based resins for the thermoplastic resin are not particularly restricted but include one or more from among polyethylene terephthalate (PET), polybutylene terephthalate (PBT), polyethylene naphthalate (PEN), polybutylene succinate (PBS), polybutylene succinate adipate (PBSA), polybutylene adipate terephthalate (PBAT), polyallylate (PAR), polyhydroxyalkanoic acids (PHA) (polyester resins composed of 3-hydroxyalkanoic acids), polylactic acid (PLA) and polycarbonate (PC). Preferred polyester-based resins among these include PET, PBS, PBSA, PBT and PEN, with PBS, PBSA and PBT being more preferred.

The terminal groups of the polyester-based resin can be freely altered by the monomer ratio during polymerization and by the presence or absence and amount of stabilizer at the ends, and preferably the carboxy-terminal group ratio with respect to the total terminal groups of the polyester-based resin ([COOH]/[total terminal groups]) is 0.30 to 0.95. The lower limit for the carboxy-terminal group ratio is more preferably 0.35, yet more preferably 0.40 and most preferably 0.45. The lower limit for the carboxy-terminal group ratio is more preferably 0.90, yet more preferably 0.85 and most preferably 0.80. The carboxy-terminal group ratio is preferably 0.30 or greater from the viewpoint of dispersibility of the cellulose nanofibers (B) in the composition, and it is preferably no greater than 0.95 from the viewpoint of the color tone of the obtained composition.

Polyacetal-based resins preferred as thermoplastic resins are commonly homopolyacetals obtained from formaldehyde starting materials and copolyacetals with trioxane as the main monomer and comprising 1,3-dioxolane, for example, as a comonomer component, and although both of these may be used, copolyacetals are preferably used from the viewpoint of thermal stability during working. The amount of comonomer component (for example, 1,3-dioxolane) is more preferably in the range of 0.01 to 4 mol %. The preferred lower limit for the comonomer component amount is 0.05 mol %, more preferably 0.1 mol % and even more preferably 0.2 mol %. The upper limit is more preferably 3.5 mol %, even more preferably 3.0 mol %, yet more preferably 2.5 mol % and most preferably 2.3 mol %. The lower limit is preferably in the range specified above from the viewpoint of thermal stability during extrusion and during molding, and the upper limit is preferably in the range specified above from the viewpoint of mechanical strength.

<Cellulose Nanofibers (B)>

The cellulose nanofibers (B) are cellulose with a mean fiber size of 1000 nm or smaller. Preferred examples of cellulose nanofibers (B) include, but are not limited to, one or more types from among cellulose nanofibers obtained using cellulose pulp starting materials, and modified forms of such cellulose. From the viewpoint of stability and performance, it is preferable to use one or more types of modified cellulose. The mean fiber size of the cellulose nanofibers (B) is 1000 nm or smaller, preferably 500 nm or smaller and more preferably 200 nm or smaller, from the viewpoint of obtaining satisfactory mechanical strength (especially tensile modulus) for the resin molded body. While a smaller mean fiber size is preferred, it is preferably 10 nm or greater, more preferably 20 nm or greater and even more preferably 30 nm or greater from the viewpoint of easier processing. The mean fiber size is the value determined to be the equivalent spherical diameter (volume-average particle diameter) of the particles at a cumulative volume of 50% using a laser diffraction/scattering method-based particle size distribution meter.

The mean fiber size can be measured by the following method. The cellulose nanofibers (B) at a solid content of 40 mass % are kneaded for 30 minutes in a planetary mixer (for example, a 5DM-03-R by Shinagawa Machinery Works Co., Ltd., hook-type stirring blade) at 126 rpm, room temperature and ordinary pressure, and then a purified water suspension is prepared to 0.5 mass %, a high-shear homogenizer (for example, an "Excel ED-7 Autohomogenizer", trade name of Nippon Seiki Co., Ltd., processing conditions) is used for dispersion at rotational speed: 15,000 rpm×5 minutes, a centrifugal separator (for example, a "Model 6800 Centrifugal Separator", trade name of Kubota Corp., Rotor type Model RA-400) is used for centrifugation under conditions with a centrifugal force of 39,200 m$^2$/s for 10 minutes, producing a supernatant, and the supernatant is centrifuged at 116,000 m$^2$/s for 45 minutes, producing a centrifugation supernatant. The supernatant liquid is used to measure the 50% cumulative particle diameter, as the volume-average particle diameter (specifically, the equivalent spherical diameter of particles at a cumulative volume of 50% with respect to the total volume of the particles), in the volume frequency particle size distribution obtained using a laser diffraction/scattering method-based particle size distribution meter (for example, an "LA-910" or "LA-950", trade names of Horiba, Ltd., with ultrasonic treatment for 1 minute, refractive index: 1.20).

According to a typical aspect, the L/D ratio of the cellulose nanofibers (B) is 20 or greater. The lower limit for L/D of the cellulose nanofibers is preferably 30, more preferably 40, even more preferably 50 and yet more preferably 100. The upper limit is not particularly restricted but is preferably 10,000 or lower from the viewpoint of handleability. The L/D ratio of the cellulose nanofibers is preferably within this range to exhibit satisfactory mechanical properties for the resin composition of this disclosure using a small amount of cellulose nanofibers.

For the present disclosure, the length (L), diameter (D) and L/D ratio of the cellulose nanofibers are determined by preparing aqueous dispersions of the cellulose nanofibers, each aqueous dispersion being dispersed using a high-shear homogenizer (for example, an "Excel ED-7 Autohomogenizer", trade name of Nippon Seiki Co., Ltd.), under processing conditions of rotational speed: 15,000 rpm×5 minutes, diluting the aqueous dispersion with purified water to 0.1 to 0.5 mass %, casting this onto mica, and using the air-dried product as a measuring sample for measurement with an optical microscope or a high-resolution scanning microscope (SEM) or atomic force microscope (AFM). Specifically, the length (L) and diameter (D) of 100 randomly selected cellulose nanofibers are measured in an observation field with the magnification adjusted so as to observe at least 100 cellulose nanofibers, and the ratio (L/D) is calculated. The lengths and diameters of the cellulose nanofibers of the present disclosure are the number-average values for the 100 cellulose fibers.

The cellulose nanofibers (B) may be cellulose obtained by treating pulp or the like with hot water or the like at 100° C. or higher, hydrolyzing the hemicellulose portion to weaken it, and then defibrating by a pulverizing method using a high-pressure homogenizer, microfluidizer, ball mill or disk mill.

According to one aspect, the cellulose nanofibers (B) are modified (i.e. modified cellulose nanofibers). The modified cellulose nanofibers (B) may have the cellulose modified with one or more modifying agents selected from among esterifying agents, silylating agents, isocyanate compounds, halogenated alkylating agents, alkylene oxides and/or glycidyl compounds. According to a preferred aspect, the cellulose nanofibers (B) are unmodified, or are modified by lacking oxoacid-modified groups (i.e. sites where the hydroxyl groups of the cellulose are converted with oxoacids (such as carboxylic acids) or their salts (such as carboxylic acid salts)), preferred examples of modified forms being forms modified with the modifying agents mentioned above.

An esterifying agent used as a modifying agent includes any organic compound having at least one functional group capable of reacting with the hydroxyl groups on the surfaces of the cellulose nanofibers (B) to esterify them. The esterification can be carried out by the method described in paragraph [0108] of International Patent Publication No. 2017/159823. The esterifying agent may be a commercially available reagent or product.

Preferred examples of esterifying agents are not particularly restricted and include aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid and isobutyric acid; alicyclic monocarboxylic acids such as cyclohexanecarboxylic acid; aromatic monocarboxylic acids such as benzoic acid, toluic acid, α-naphthalenecarboxylic acid, 3-naphthalenecarboxylic acid, methylnaphthalenecarboxylic acid and phenylacetic acid; and any optionally selected mixtures of the same, as well as acid and vinyl alcohol ester compounds (such as vinyl acetate, vinyl propionate, vinyl butyrate, vinyl valerate, vinyl caproate, vinyl caprylate and vinyl laurate) and, selected from among the acids mentioned above, symmetrical anhydrides (such as acetic anhydride, maleic anhydride, cyclohexane-carboxylic acid anhydride and benzene-sulfonic acid anhydride), mixed acid anhydrides (such as butyric-valeric anhydride), cyclic anhydrides (such as succinic anhydride, phthalic anhydride, naphthalene-1,8:4,5-tetracarboxylic dianhydride and cyclohexane-1,2,3,4-tetracarboxylic 3,4-anhydride) and ester acid anhydrides (such as acetic-3-(ethoxycarbonyl)propanoic anhydride and benzoylethyl carbonate).

Preferred for use among these from the viewpoint of reactivity, stability and cost are acetic acid, propionic acid, butyric acid, valeric acid, caproic acid, caprylic acid, lauric acid, tridecanoic acid, myristic acid, palmitic acid and stearic acid, esters of these acids with vinyl alcohol, and benzoic acid, acetic anhydride, maleic anhydride, succinic anhydride and phthalic anhydride.

A silylating agent used as a modifying agent may be any Si-containing compound having at least one reactive group that can react with the hydroxyl groups on the surface of the cellulose, or groups remaining after their hydrolysis. The silylating agent may be a commercially available reagent or product.

Preferred examples of silylating agents include, but are not limited to, chlorodimethylisopropylsilane, chlorodimethylbutylsilane, chlorodimethyloctylsilane, chlorodimethyldodecylsilane, chlorodimethyloctadecylsilane, chlorodimethylphenylsilane, chloro(1-hexenyl)dimethylsilane, dichlorohexylmethylsilane, dichloroheptylmethylsilane, trichlorooctylsilane, hexamethyldisilazane, 1,3-divinyl-1,1,3,3-tetramethyldisilazane, 1,3-divinyl-1,3-diphenyl-1,3-dimethyl-disilazane, 1,3-N-dioctyltetramethyl-disilazane, diisobutyltetramethyldisilazane, diethyltetramethyldisilazane, N-dipropyltetramethyldisilazane, N-dibutyltetramethyldisilazane or 1,3-di(para-t-butylphenethyl)tetramethyldisilazane, N-trimethylsilylacetamide, N-methyldiphenylsilylacetamide, N-triethylsilylacetamide, t-butyldiphenylmethoxysilane, octadecyldimethylmethoxysilane, dimethyloctylmethoxysilane, octylmethyldimethoxysilane, octyltrimethoxysilane, trimethylethoxysilane and octyltriethoxysilane.

Preferred for use among these from the viewpoint of reactivity, stability and cost are hexamethyldisilazane, octadecyldimethylmethoxysilane, dimethyloctylmethoxysilane and trimethylethoxysilane.

A halogenated alkylating agent used as a modifying agent includes any organic compound having at least one functional group capable of reacting with the hydroxyl groups on the surfaces of cellulose to form alkyl halides. The halogenated alkylating agent used may be a commercially available reagent or product.

Preferred examples of halogenated alkylating agents are not particularly restricted and include chloropropane, chlorobutane, bromopropane, bromohexane, bromoheptane, iodomethane, iodoethane, iodooctane, iodooctadecane and iodobenzene. Preferred for use among these from the viewpoint of reactivity, stability and cost are bromohexane and iodooctane.

An isocyanate compound used as a modifying agent may be any organic compound having at least one isocyanate group capable of reacting with the hydroxyl groups on the surfaces of the cellulose nanofibers (B). The isocyanate compound may be a blocked isocyanate compound that allows the blocking groups to dissociate at a specific temperature to regenerate isocyanate groups, or a polyisocyanate dimer or trimer, or a modified isocyanate biuret or polymethylene polyphenyl polyisocyanate (polymeric MDI). They may be commercially available reagents or products.

Preferred examples of isocyanate compounds include, but are not limited to, aliphatic polyisocyanates, alicyclic polyisocyanates, aromatic polyisocyanates, aromatic-aliphatic polyisocyanates and blocked isocyanate compounds and polyisocyanates. Examples include tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, 3-methylpentane-1,5-diisocyanate, isophorone diisocyanate, hydrogenated xylylene diisocyanate, 4,4'-dicyclohexylmethane diisocyanate, 1,4-cyclohexane diisocyanate, methylcyclohexylene diisocyanate, 1,3-bis(isocyanatomethyl)cyclohexane), tolylene diisocyanate (TDI), 2,2'-diphenylmethane diisocyanate, 2,4'-diphenylmethane diisocyanate, 4,4'-diphenylmethane diisocyanate (MDI), 4,4'-dibenzyl diisocyanate, 1,5-naphthylene diisocyanate, xylylene diisocyanate, 1,3-phenylene diisocyanate, 1,4-phenylene diisocyanate), dialkyldiphenylmethane diisocyanates, tetraalkyldiphenylmethane diisocyanates, α,α,α,α-tetramethylxylylene diisocyanate, and blocked isocyanate compounds obtained by reacting these isocyanate compounds with oxime-based blocking agents, phenol-based blocking agents, lactam-based blocking agents, alcohol-based blocking agents, activated methylene-based blocking agents, amine-based blocking agents, pyrazole-based blocking agents, bisulfate-based blocking agents and imidazole-based blocking agents.

Preferred for use among these from the viewpoint of reactivity, stability and cost are TDI, MDI, hexamethylene diisocyanate, and blocked isocyanates obtained using hexamethylene diisocyanate-modified compounds and hexamethylene diisocyanate as starting materials.

The dissociation temperature of the blocking groups of these blocked isocyanate compounds is at maximum preferably 210° C., more preferably 190° C. and even more preferably 150° C., from the viewpoint of reactivity and stability. The minimum is preferably 70° C., more preferably 80° C. and even more preferably 110° C. Blocking agents with blocking group dissociation temperatures in this range include methyl ethyl ketone oxime, ortho-secondary butylphenol, caprolactam, sodium bisulfate, 3,5-dimethylpyrazole and 2-methylimidazole.

An alkylene oxide and/or glycidyl compound used as a modifying agent may be any organic compound having at least one alkylene oxide, glycidyl and/or epoxy group capable of reacting with the hydroxyl groups on the surface of cellulose. The alkylene oxide and/or glycidyl compound may be a commercially available reagent or product.

Preferred examples of alkylene oxide and/or glycidyl compounds include, but are not limited to, glycidyl ethers such as methyl glycidyl ether, ethyl glycidyl ether, butyl glycidyl ether, 2-ethylhexyl glycidyl ether, 2-methyloctyl glycidyl ether, phenyl glycidyl ether, p-tertiary butylphenyl glycidyl ether, sec-butylphenyl glycidyl ether, n-butylphenyl glycidyl ether, phenylphenol glycidyl ether, cresyl glycidyl ether and dibromocresyl glycidyl ether; glycidyl esters such as glycidyl acetate and glycidyl stearate; and polyhydric alcohol glycidyl ethers such as ethyleneglycol diglycidyl ether, propyleneglycol diglycidyl ether, 1,4-butanediol diglycidyl ether, hexamethyleneglycol diglycidyl ether, resorcinol diglycidyl ether, bisphenol A diglycidyl ether, polyethyleneglycol diglycidyl ether, polypropyleneglycol diglycidyl ether, polybutyleneglycol diglycidyl ether, glycerol triglycidyl ether, trimethylolpropane-triglycidyl ether, pentaerythritol tetraglycidyl ether, sorbitol polyglycidyl ether, sorbitan polyglycidyl ether, polyglycerol polyglycidyl ether and diglycerol polyglycidyl ether.

Preferred for use among these from the viewpoint of reactivity, stability and cost are 2-methyloctyl glycidyl ether, hexamethyleneglycol diglycidyl ether and pentaerythritol tetraglycidyl ether.

The total degree of substitution of the modified cellulose nanofibers is 0.5 or greater, 0.7 or greater or 0.75 or greater from the viewpoint of obtaining satisfactory dispersibility of the cellulose nanofibers (B) in the thermoplastic resin (A), and 1.5 or lower, 1.3 or lower or 1.25 or lower from the viewpoint of satisfactorily maintaining the physical properties of the cellulose nanofibers (B). According to one aspect, the modified cellulose nanofibers are esterified cellulose nanofibers, and the total degree of substitution is the total degree of ester substitution. The degree of substitution can be determined, after freeze-shattering the modified cellulose nanofibers and subjecting them to $^{13}C$ solid NMR measurement, using the following formula representing the area intensity (Inf) of the signal attributed to one carbon atom of the modifying group, with respect to the total area intensity (Inp) of the signals attributed to C1-C6 carbons of the pyranose rings of cellulose, appearing in the range of 50 ppm to 110 ppm.

Degree of substitution=$(Inf)\times 6/(Inp)$

For example, when the modifying group is acetyl, the signal at 23 ppm attributed to —$CH_3$ may be used.

The conditions in the $^{13}C$ solid NMR measurement may be as follows, for example.
Apparatus: Bruker Biospin Avance 500WB
Frequency: 125.77 MHz
Measuring method: DD/MAS
Latency time: 75 sec
NMR sample tube: 4 mmφ
Number of scans: 640 (~14 hr)
MAS: 14,500 Hz
Chemical shift reference: glycine (external reference: 176.03 ppm)

<Additional Components>

The main supply material may also include optional additional components in addition to the thermoplastic resin (A) and cellulose nanofibers (B). Such additional components include surface treatment agents, antioxidants, inorganic fillers and lubricant oils. Each of the components may be used alone, or in combinations of two or more. They may also be either commercially available reagents or products.

Preferred examples for the surface treatment agent include compounds having a hydrophilic segment and a hydrophobic segment in the molecule, and more specifically copolymers obtained using one or more from among compounds that provide hydrophilic segments (for example, polyethylene glycol) and compounds that provide hydrophobic segments (for example, polypropylene glycol, poly(tetramethylene ether) glycol (PTMEG) and polybutadienediol) (for example, block copolymers of propylene oxide and ethylene oxide or block copolymers of tetrahydrofuran and ethylene oxide).

From the viewpoint of increasing dispersibility of the cellulose nanofibers (B) in the resin molded body, the content of the surface treatment agent in the main supply material is preferably 0.1 mass % or greater, or 0.2 mass % or greater, or 0.5 mass %, while from the viewpoint of inhibiting plasticization of the resin molded body to maintain satisfactory strength, it is preferably 50 mass % or lower, or 30 mass %, 20 mass %, 18 mass %, 15 mass %, 10 mass % or 5 mass %.

From the viewpoint of increasing the dispersibility of the cellulose nanofibers (B) in the resin molded body, the amount of the surface treatment agent with respect to 100 parts by mass of the cellulose nanofibers (B) is preferably 0.1 parts by mass or greater, 0.5 parts by mass or greater or 1 parts by mass or greater, while from the viewpoint of inhibiting plasticization of the resin molded body and maintaining satisfactory strength it is preferably 100 parts by mass or lower, 99 parts by mass or lower, 90 parts by mass or lower, 80 parts by mass or lower, 70 parts by mass or lower, 50 parts by mass or lower or 40 parts by mass or lower.

From the viewpoint of an effect of preventing heat-induced deterioration, the antioxidant is preferably a hindered phenol-based antioxidant, sulfur-based antioxidant or phosphorus-based antioxidant, more preferably a phosphorus-based antioxidant or hindered phenol-based antioxidant, and even more preferably a combination of a phosphorus-based antioxidant and/or hindered phenol-based antioxidant with a hindered amine-based light stabilizer (HALS).

The amount of antioxidant with respect to the total resin molded body is preferably 0.01 mass % or greater, 0.02 mass % or greater, 0.03 mass % or greater or 0.05 mass % or greater, and preferably 5 mass % or lower, 4 mass % or lower, 3 mass % or lower, 2 mass % or lower or 1 mass % or lower.

The inorganic filler may be filamentous particles, plate-shaped particles or an inorganic pigment. Filamentous particles and plate-shaped particles may have a mean aspect ratio of 5 or greater. Specifically, they may be glass fibers, glass flakes, glass balloons, carbon fibers, carbon nanotubes, carbon black, talc, mica, wollastonite, calcium carbonate, barium sulfate, magnesium hydroxide, magnesium oxide, tobamolite, halloysite, halloysite nanotubes, titanium dioxide, zinc sulfide, zinc oxide, iron oxide or iron sulfide. From the viewpoint of increasing the handleability during molding from the resin composition into a resin molded body, the amount of inorganic filler in the resin molded body is preferably 0.002 parts by mass to 50 parts by mass with respect to 100 parts by mass of the thermoplastic resin (A).

The lubricant oil may be a natural oil (engine oil, cylinder oil or the like), a synthetic hydrogen carbide (paraffinic oil, naphthene-based oil, aroma oil or the like), or a silicone-based oil. The molecular weight of the lubricant oil may be 100 or greater, 400 or greater or 500 or greater, for example, and 5,000,000 or lower, 2,000,000 or lower or 1,000,000 or lower, for example.

The melting point of the lubricant oil may be −50° C. or higher, −30° C. or higher or −20° C. or higher, for example, and 50° C. or lower, 30° C. or lower or 20° C. or lower, for example. The melting point is a temperature 2.5° C. lower than the pour point of the lubricant oil, which can be measured according to JIS K2269.

From the viewpoint of increasing the abrasion resistance, the content of the lubricant oil with respect to 100 parts by mass of the thermoplastic resin (A) is preferably 0.1 parts by mass or greater, 0.2 parts by mass or greater or 0.3 parts by mass or greater, while from the viewpoint of avoiding unwanted softening of the resin molded body, it is preferably 5.0 parts by mass or lower, 4.5 parts by mass or lower or 4.2 parts by mass or lower.

The total amount of additional components in the main supply material may be 0.5 mass % or greater or 2 mass % or greater, for example, and 20 mass % or lower, 15 mass % or lower or 20 mass % or lower, for example.

According to a preferred aspect, the main supply material includes 70 mass % to 99 mass % of the thermoplastic resin (A), 1 mass % to 30 mass % of the cellulose nanofibers (B) and 0 mass % to 20 mass % of additional components. According to another preferred aspect, the main supply material includes 80 mass % to 95 mass % of the thermoplastic resin (A), 5 mass % to 20 mass % of the cellulose nanofibers (B) and 1 mass % to 15 mass % of additional components, or 85 mass % to 95 mass % of the thermoplastic resin (A), 5 mass % to 15 mass % of the cellulose nanofibers (B) and 2 mass % to 10 mass % of additional components.

According to one aspect, the melt mixing is carried out with the blending ratio of the auxiliary supply material at greater than 0 mass % and 50 mass % or lower and preferably 5 to 50 mass %, with respect to 100 mass % as the total of the main supply material (a1) and auxiliary supply material (a2). From the viewpoint of satisfactorily obtaining an anisotropy-reducing effect by the cellulose nanofibers (B) of the auxiliary supply material, the blending ratio of the auxiliary supply material is preferably 5 mass % or greater, 10 mass % or greater, 15 mass % or greater or 20 mass % or greater, while from the viewpoint of satisfactorily obtaining an effect of increasing the mechanical strength by the cellulose nanofibers (B) of the main supply material, it is preferably 50 mass % or lower, 45 mass % or lower, 40 mass % or lower or 25 mass % or lower.

According to another aspect, the mass ratio of the main supply material (a1) and the mass ratio of the auxiliary supply material (a2) in the resin composition (b) may satisfy the relationship represented by the following formula:

[Mass ratio of auxiliary supply material (a2)]≥[Mass ratio of main supply material (a1)].

That is, the auxiliary supply material may be present at 50 mass % or greater in the resin composition. The mass ratio of the auxiliary supply material in the resin composition may be 55 mass % or greater, 60 mass % or greater or 70 mass % or greater. The mass ratio of the auxiliary supply material is less than 100 mass %, and is preferably 90 mass % or lower or 80 mass % or lower.

Each step of the method of the disclosure will now be explained for the first embodiment and second embodiment, with the understanding that the method of the disclosure is not limited to these embodiments.

First Embodiment

Figure 2:
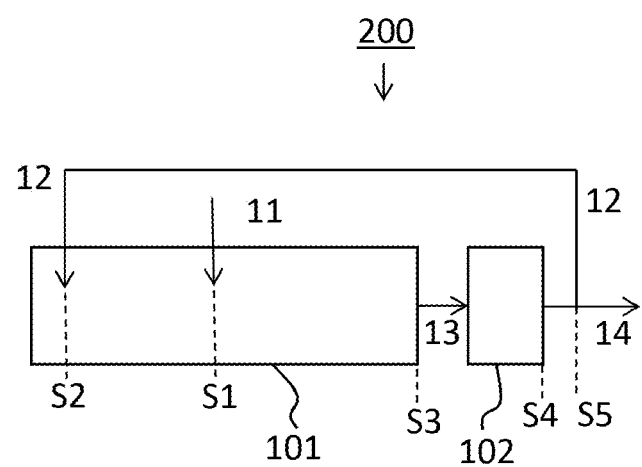
FIG. 2 is a diagram illustrating a process 200 which is an example of the method for producing a resin molded body according to the first embodiment.
Figure 3:
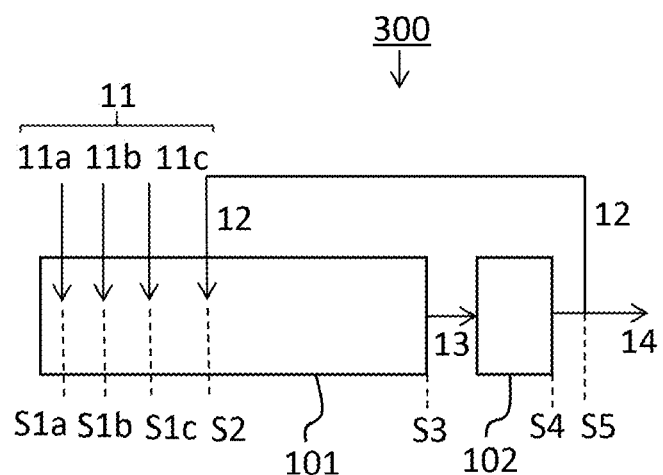
FIG. 3 is a diagram illustrating a process 300 which is an example of the method for producing a resin molded body according to the first embodiment.

FIGS. 1 to 3 are diagrams showing processes 100, 200, 300 as examples of the method for producing a resin molded body according to the first embodiment. Referring to FIGS. 1 to 3, in processes 100, 200 and 300 the main supply material 11 or its constituent components (i.e. the thermoplastic resin (A) 11a, the cellulose nanofibers (B) 11b and the optional additional component 11c), and the auxiliary supply material 12 are melt mixed in a melt mixer 101 to produce a melt-mixed resin composition 13, and the resin composition 13 is molded in a molding unit 102 to produce a resin molded body 14. The resin molded body 14 may be in the form of pellets, for example.

<Step of Preparing Main Supply Material and Auxiliary Supply Material>

The main supply material 11 may be in the form of a mixture that includes the thermoplastic resin (A) 11a, the cellulose nanofibers (B) 11b and optional additional components 11c (the main supply material 11 in FIGS. 1 and 2), or in a form with the thermoplastic resin (A) 11a, cellulose nanofibers (B) 11b and optional additional components 11c separately prepared as constituent components of the main supply material 11 (the main supply material 11 in FIG. 3). In the latter case, the constituent components of the main supply material become mixed together, and also with the auxiliary supply material, within the melt mixing system.

The auxiliary supply material 12 is the product of melting treatment of the main supply material 11. The auxiliary supply material 12 may be obtained by melting treatment of the main supply material 11 alone, or it may be a recovered portion of the resin molded body 14. In the latter case, as shown in FIGS. 1 to 3, the main supply material 11 and auxiliary supply material 12 are melt mixed and then molded, and a portion of the obtained resin molded body 14 is separated at a separating site S5 and returned back to the melt mixer 101 as auxiliary supply material 12, while the remainder is collected as the target resin molded body 14. The auxiliary supply material 12 returned to the melt mixer 101 is melt mixed with freshly supplied main supply material 11. In this cycle, the auxiliary supply material 12 is based on the main supply material 11, but is a mixture of multiple compositions that have been subjected to melting treatment a different number of times (that is, having a different thermal history).

<Resin Composition-Forming Step>

In this step, the main supply material 11 and auxiliary supply material 12 are supplied to the melt mixer 101 and melt mixed together. According to one aspect, the melt mixing is melt kneading. The melt mixer 101 may be the mixing unit of a mixer such as a single-screw extruder, twin-screw extruder, roll or Banbury mixer, for example. A twin-screw extruder is a preferred type of mixer, and more specifically it may be a twin-screw extruder equipped with a pressure-reducing device and side feeder equipment. The L/D of the twin-screw extruder may be 30 to 100, 35 to 75 or 45 to 70, for example.

The means for supplying the main supply material 11 and auxiliary supply material 12 may be any of the following.

(1) Referring to FIGS. 1 and 2, the main supply material 11, as a mixture of the thermoplastic resin (A), cellulose nanofibers (B) and optional additional components, is loaded into a main supply material-loading site S1 of the melt mixer 101, the auxiliary supply material 12 is loaded into an auxiliary supply material-loading site S2 of the melt mixer 101, and both are melt mixed to produce a resin composition 13. The positional relationship between the main supply material-loading site S1 and the auxiliary supply material-loading site S2 may be designed as appropriate for the purpose. For example, the auxiliary supply material-loading site S2 may be situated downstream from the main supply material-loading site S1 (FIG. 1), or the main supply material-loading site S1 may be situated downstream from the auxiliary supply material-loading site S2 (FIG. 2), or the main supply material 11 and auxiliary supply material 12 may be supplied simultaneously (for example, either the main supply material 11 and auxiliary supply material 12 separately, or pre-mixed).

(2) Referring to FIG. 3, the thermoplastic resin (A) 11a, cellulose nanofibers (B) 11b and optional additional components 11c, as constituent components of the main supply material 11, are each loaded into different main supply material-loading sites S1a, S1b, S1c of a melt mixer 101, the auxiliary supply material 12 is loaded into an auxiliary supply material-loading site S2 of the melt mixer 101, thus introducing the main supply material 11 and auxiliary supply material 12 into the melt mixing system, and both are melt mixed to produce a resin composition 13. The manner of supplying the constituent components of the main supply material 11 may be designed according to the intended purpose, and each of the constituent components may be supplied to the melt mixer 101 separately, or some of the constituent components may be premixed and supplied to the melt mixer 101. FIG. 3 shows an example of supplying the thermoplastic resin (A) 11a, cellulose nanofibers (B) 11b and optional additional components 11c in that order from the upstream end of the melt mixer 101, but the order of supply is not limited to this and may be appropriately changed depending on the purpose. The positional relationship between the main supply material-loading site S1 and the auxiliary supply material-loading site S2 may also be set as appropriate, similar to the order of (1) above.

The temperature and time for melt mixing may be set as appropriate for the desired resin molded body. When a portion of the resin molded body 14 is to be used as the auxiliary supply material 12, the preferred conditions, from the viewpoint of obtaining a satisfactory effect of improving the physical properties with the auxiliary supply material (in particular, both satisfactory mechanical strength and low anisotropy), are a temperature in the range from the melt start temperature of the thermoplastic resin (A) to the melt start temperature+100° C., or from the melt start temperature+10° C. to the melt start temperature+90° C., or from the melt start temperature+20° C. to the melt start temperature+85° C., where the "melt start temperature" is the melting point in the case of a crystalline resin, or the temperature at which it begins to easily flow, in the case of an amorphous resin. Generally, it may be the measuring temperature for the melt mass-flow rate. The time is 0.1 minute to 3 minutes, 0.2 minute to 2.5 minutes or 0.3 minute to 2.0 minutes. The pressure during melt mixing may be set according to the purpose, but a preferred example is a pressure of −0.1 MPa to 10 MPa, −0.15 MPa to 8 MPa or −0.2 MPa to 5 MPa.

<Molding Step>

In this step, the resin composition 13 is sent to the molding unit 102 from a mixing completion site S3 of the melt mixer 101, and molded by the molding unit 102 into the target shape (a molded article such as pellets, a sheet, a film, or a three-dimensional structure), after which the target resin molded body 14 is extracted from a delivery site S4. According to a preferred aspect, the melt mixing is melt kneading, and the melt kneading and molding are carried out in a single kneader (for example, the one described under <Resin composition-forming step>). According to another preferred aspect, the molding is carried out in a molding machine different from the machine for melt kneading (for example, an injection molding machine).

According to one aspect, a portion of the resin molded body 14 is separated in the separating site S5 and returned to the melt mixer 101 as the auxiliary supply material 12, with the remainder being recovered as product. That is, the method according to one aspect further includes returning a portion of the resin molded body 14 to the resin composition-forming step as at least part of the auxiliary supply material. According to this aspect, therefore, the resin molded body includes cellulose nanofibers that have passed through melting treatment of the main supply material and at least two resin composition-forming steps. The proportion of cellulose nanofibers that have passed through melting treatment of the main supply material and at least two resin composition-forming steps is preferably 20 mass % or lower, 15 mass % or lower or 10 mass % or lower, with respect to 100 mass % as the total amount of the cellulose nanofibers in the resin molded body. When the cellulose nanofibers include lignin, the cellulose nanofibers preferably do not have an excessive thermal history from the viewpoint of satisfactorily avoiding coloration and odor (odor due to the decomposing components). A proportion in the range specified above is advantageous for avoiding coloration and odor. The proportion may also be 1 mass % or greater, 2 mass % or greater or 5 mass % or greater, from the viewpoint of avoiding coloration and odor, while also avoiding increased production cost of the resin molded body.

The form of the resin molded body according to the first embodiment may be pellets, sheet-like, fibrous, plate-like, rod-like or tubular, but pellets are preferred for easier post-treatment and transport. The shapes of the pellets may differ depending on the manner of cutting at the time of extrusion, and may be round, elliptical or cylindrical, for example. For example, pellets cut by "underwater cutting" are usually round, pellets cut by "hot cutting" are usually round or elliptical, and pellets cut by "strand cutting" are usually cylindrical. The pellet diameters for round pellets may be 1 mm to 3 mm. For cylindrical pellets, the pellet diameters may be 1 mm to 3 mm, for example, with pellet lengths of 2 mm to 10 mm, for example. The pellet sizes are preferably above these specified lower limits from the viewpoint of operational stability during extrusion, and they are preferably lower than the specified upper limits from the viewpoint of seizing in the molding machine in post-working.

Second Embodiment

Figure 4:
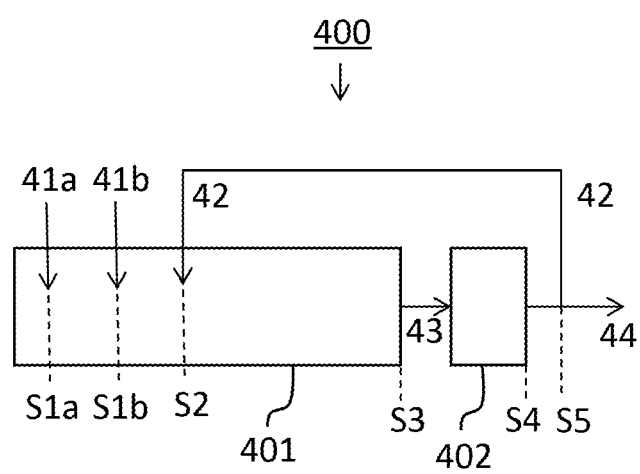
FIG. 4 is a diagram illustrating a process 400 which is an example of the method for producing a resin molded body according to a second embodiment of the invention.

FIG. 4 is a diagram showing a process 400 as an example of the method for producing a resin molded body according to a second embodiment of the invention. Referring to FIG. 4, in the process 400, the resin composition 43 is produced as a molten mixture obtained by melt mixing the main supply material 41 and auxiliary supply material 42 in the melt mixer 401, and the resin composition 43 is molded in a molding unit 402 to produce a resin molded body 44.

The resin molded body 44 may be in a form suitable for supply to subsequent steps (such as pellets), or in the form of a product as described below.

<Step of Preparing Main Supply Material and Auxiliary Supply Material>

The main supply material 41 may include a first material 41a and a second material 41b. According to one aspect, the first material 41a is a molten mixture. According to another aspect, the first material 41a may be a resin molded body 14 obtained by the first embodiment. According to another aspect, the first material 41a is a molded article containing 100 parts by mass of the thermoplastic resin (A) and 1 to 50 parts by mass of the cellulose nanofibers (B).

The auxiliary supply material 42 is the product of melting treatment of the main supply material 41. The auxiliary supply material 42 may be obtained by melting treatment of the main supply material 41 alone, or it may be a recovered portion of the resin molded body 44. In the latter case, as shown in FIG. 4, the main supply material 41 and auxiliary supply material 42 are melt mixed and then molded, and a portion of the obtained resin molded body 44 is separated and returned back to the melt mixer 401 as auxiliary supply material 42, while the remainder is collected as the target resin molded body 44. The auxiliary supply material 42 returned to the melt mixer 401 is melt mixed with freshly supplied main supply material 41. In this cycle, the auxiliary supply material 42 is based on the main supply material 41, but is a mixture of multiple compositions that have been subjected to melting treatment a different number of times (that is, having a different thermal history).

<Resin Composition-Forming Step>

In this step, the main supply material 41 and auxiliary supply material 42 are supplied to the melt mixer 401 and melt mixed together. According to one aspect, the melt mixing is melt kneading. The melt mixer 401 may be the same as the melt mixer 101 for the first embodiment. Specifically, the melt mixer 401 may be the mixing unit of a mixer such as a single-screw extruder, twin-screw extruder, roll or Banbury mixer, for example. A twin-screw extruder is a preferred mixer, and more specifically it may be a twin-screw extruder equipped with a pressure-reducing device and side feeder equipment. The L/D of the twin-screw extruder may be 30 to 100, 35 to 75 or 45 to 70, for example.

The means for supplying the main supply material 41 and auxiliary supply material 42 may be any of the following.

Referring to FIG. 4, the first material 41a and second material 41b, as the main supply material 41, are each supplied to different main supply material-loading sites S1a, S1b of the melt mixer 401, while the auxiliary supply material 42 is loaded into the auxiliary supply material-loading site S2 of the melt mixer 401, and both are melt mixed to produce a resin composition 43. The manner in which the first material 41a and second material 41b are supplied may be designed according to the purpose, and they may be supplied to the melt mixer 401 separately or in pre-mixed form. FIG. 4 shows an example of supplying the first material 41a, second material 41b and auxiliary supply material 42 in that order from the upstream end of the melt mixer 401, but the order of supply is not limited to this and may be set as appropriate for the purpose. The positional relationship between the main supply material-loading site S1 and the auxiliary supply material-loading site S2 may also be set as appropriate.

The temperature and time for melt mixing may be set as appropriate for the desired resin molded body. When a portion of the resin molded body 44 is to be used as the auxiliary supply material 42, the preferred conditions, from the viewpoint of obtaining a satisfactory effect of improving the physical properties with the auxiliary supply material (in particular, both satisfactory mechanical strength and low anisotropy), are a temperature from the melt start temperature of the thermoplastic resin (A) to the melt start temperature+100° C., or from the melt start temperature+10° C. to the melt start temperature+90° C., or from the melt start temperature+20° C. to the melt start temperature+85° C., where the "melt start temperature" is the melting point in the case of a crystalline resin, or the temperature at which it begins to easily flow, in the case of an amorphous resin. Generally, it may be the measuring temperature for the melt mass-flow rate. The time is 0.1 minute to 3 minutes, 0.2 minute to 2.5 minutes or 0.3 minute to 2.0 minutes. The pressure during melt mixing may be set according to the purpose, but a preferred example is a pressure of 0.01 MPa to 10 MPa, 0.02 MPa to 8 MPa or 0.03 MPa to 5 MPa.

According to one aspect, the relationship between the elastic modulus of the main supply material (a1) and the elastic modulus of the resin composition (b) is preferably [elastic modulus of resin composition (b)] [elastic modulus of main supply material (a1)×0.99], or [elastic modulus of resin composition (b)] [elastic modulus of main supply material (a1)×1.00], or [elastic modulus of resin composition (b)] [elastic modulus of main supply material (a1)×1.05], or [elastic modulus of resin composition (b)] [elastic modulus of main supply material (a1)×1.10]. Such a resin composition (b) is advantageous because it yields a resin molded body with an excellent elastic modulus. From the viewpoint of easy production of the resin composition (b), it may be [elastic modulus of resin composition (b)] [elastic modulus of main supply material (a1)×1.50], or [elastic modulus of resin composition (b)] [elastic modulus of main supply material (a1)×1.40], or [elastic modulus of resin composition (b)] [elastic modulus of main supply material (a1)×1.30]. The elastic modulus referred to here is a value obtained by the same measuring method, and it may be the flexural modulus or tensile modulus.

<Molding Step>

In this step, the resin composition 43 is sent to the molding unit 402 from a mixing completion site S3 of the melt mixer 401, and molded by the molding unit 402 into the target shape, after which the target resin molded body 44 is extracted from a delivery site S4. The molding unit 402 may be constructed for molding in a manner selected from among extrusion molding, injection molding, vacuum forming, blow molding, injection compression molding, decorative molding, mixed material molding, gas assisted injection molding, foam injection molding, low-pressure molding, ultrathin injection molding (ultra high-speed injection molding) and in-mold composite molding (insert molding or outsert molding), for example. According to a preferred aspect, the melt mixing is melt kneading, and the melt kneading and molding are carried out in a single kneader (for example, the one described under <Resin composition-forming step>).

According to one aspect, a portion of the resin molded body 44 is returned to the melt mixer 401 from the auxiliary supply material-loading site S2, with the remainder being recovered as product. That is, the method according to one aspect further includes returning a portion of the resin molded body 44 to the resin composition-forming step as at least part of the auxiliary supply material. According to one aspect, for the same reason explained in regard to the first embodiment, the proportion of cellulose nanofibers that have passed through at least two resin composition-forming steps is preferably 20 mass % or lower, 15 mass % or lower or 10 mass % or lower, and may be 1 mass % or greater, 2 mass % or greater or 5 mass % or greater, for example, with respect to 100 mass % as the total amount of the cellulose nanofibers in the resin molded body.

The form of the resin molded body according to the second embodiment may be any of various molded product forms, in addition to those mentioned for the first embodiment. Such products include, but are not limited to, mechanism components such as cams, sliders, levers, arms, clutches, felt clutches, idler gears, pulleys, rollers, soft rollers, key stems, key tops, shutters, reels, shafts, joints, axes, bearings and guides; outsert molding resin parts, insert molding resin parts, office automation equipment members such as chassis, trays, side plates, printers and copying machines; camera or video equipment parts such as VTRs (Video tape recorder), video movies, digital video cameras, cameras and digital cameras; cassette players, optical disk drives such as DAT, LD (Laser disk), MD (Mini disk), CD (Compact disk) [including CD-ROM (Read only memory), CD-R (Recordable) and CD-RW (Rewritable)], DVD (Digital versatile disk) [including DVD-ROM, DVD-R, DVD+R, DVD-RW, DVD+RW, DVD-R DL, DVD+R DL, DVD-RAM (Random access memory) and DVD-Audio], Blu-ray® Disc and HD-DVD; music, image and data devices such as MFD (Multi Function Display), MO (Magneto-Optical Disk), navigation systems and mobile personal computers, communication device parts in cellular phones and facsimiles; electrical device parts; and electronic device parts. The molded article of this embodiment may be an automobile part, which term includes fuel related parts such as gasoline tanks, fuel pump modules, valves and gasoline tank flanges; door-related parts such as door locks, door handles, window regulators and speaker grills; seat belt peripheral parts such as seat belt slip rings and press buttons, parts such as combination switch parts, switches and clips; mechanical parts for extracting and inserting mechanical pencil pen tips or mechanical pencil cores; opening and closing mechanical parts for wash basins, drainage ports and drain plugs; automatic vending machine opening and closing lock mechanisms and product discharge mechanical parts; clothing cord stoppers, adjustors and buttons; watering nozzles and watering hose connecting joints; construction parts such as stair railings and flooring material supports; disposable cameras, toys, fasteners, chains, conveyors, buckles, sports goods, automatic vending machines, furniture, musical instruments, industrial machinery parts (for example, electromagnetic device housings, roll materials, transport arms and medical equipment members), general machine parts, automobile/railway/vehicle parts (for example, outer platings, chassis, aerodynamic members, seats and internal transmission friction materials), ship members (for example, hulls and seats), aviation-related parts (for example, fuselages, wings, tail units, rotor blades, fairings, cowls, doors, seats and interior finishing materials), spacecraft, artificial satellite members (motor cases, wings, structures and antennas), electronic and electrical components (for example, personal computer housings, cellular phone housings, OA devices, AV devices, telephone sets, facsimiles, household electrical appliances and toy parts), construction and civil engineering materials (for example, reinforcing metal substitute materials, truss structures and suspension bridge cables), daily household items, sports and leisure goods (for example, golf club shafts, fishing rods, and tennis and badminton rackets), wind power generation housing members, and containers and packaging materials, or materials for high-pressure vessels filled with hydrogen gas, such as fuel cells.

<Properties of Resin Molded Body>

A resin molded body produced by the method of the disclosure has the fiber lengths of the cellulose nanofibers (B) controlled in a special manner, so that both satisfactory mechanical strength and low anisotropy are obtained.

According to one aspect, the TD/MD ratio for the molding shrinkage of the resin molded body may be 1.01 to 3.0, 1.01 to 1.75, 1.01 to 1.6 or 1.01 to 1.4. The molding shrinkage is the value measured by the method of ISO294-4. The molding for this purpose is carried out under conditions according to the ISO standards referred to in regard to the molding method for the resin that is used. The MD direction and TD direction are, respectively, the MD direction and TD direction during molding of the resin molded body. The TD/MD ratio of the molding shrinkage is preferably within this range because anisotropy of the resin molded body will be reduced.

According to one aspect, the tensile strength of the resin molded body is 90 MPa or greater, 95 MPa or greater, 100 MPa or greater or 110 MPa or greater. The tensile strength preferably satisfies this condition because the mechanical strength of the resin molded body will be higher. The tensile strength is the value measured by the method of ISO527. The suitable molding conditions are the same as described for the molding shrinkage. The tensile strength may be 300 MPa or lower, 280 MPa or lower or 250 MPa or lower, for balance with the other properties of the resin molded body (such as toughness).

According to a particularly preferred aspect, both the TD/MD ratio and the tensile strength of the resin molded body are within the specified ranges.

According to one aspect, the molding shrinkage of the resin molded body in the MD direction is preferably 0.1% or greater, 0.2% or greater or 0.3% or greater, and preferably 1.2% or lower, 1.0% or lower or 0.7% or lower. According to one aspect, the molding shrinkage of the resin molded body in the TD direction is preferably 0.4% or greater or 0.5% or greater, and preferably 1.2% or lower, 1.0% or lower or 0.9% or lower.

In a resin molded body according to one aspect, the sum of the molding shrinkage in the MD direction and the molding shrinkage in the TD direction may be 0.5% to 2.6%, 0.5% to 1.9%, 0.6% to 1.6% or 0.8% to 1.5%.

For the resin molded body according to one aspect, preferably [Rb]<[Ra1], [Rb]<[Ra1×0.95], [Rb]<[Ra1×0.90] or [Rb]<[Ra1×0.85], where Rb is the TD/MD ratio of the molding shrinkage of the resin molded body and Ra1 is the TD/MD ratio of the molding shrinkage of the comparison resin molded body using only the main supply material. Such a resin molded body is advantageous due to its low anisotropy of molding shrinkage. The relationship between Ra1 and Rb may be [Rb]>[Ra1×0.50], [Rb]>[Ra1×0.60] or [Rb]>[Ra1×0.70], for example, from the viewpoint of ease of production of the resin molded body.

The linear expansion coefficient (in the MD direction) of the resin molded body in a temperature range of 0° C. to 60° C. is preferably 60 ppm/K or lower, 50 ppm/K or lower, 45 ppm/K or lower or 35 ppm/K or lower. The lower limit for the linear expansion coefficient is not particularly restricted, but from the viewpoint of easier production it is preferably 5 ppm/K or higher and more preferably 10 ppm/K or higher, for example. The linear expansion coefficient is the value measured according to ISO11359-2.

According to one aspect, the difference between the value of the yellowness index (YI) of the resin molded body and the value of the yellowness index (YI) of the auxiliary supply material may be 10 or less, 8 or less or 7 or less. The value of the yellowness index (YI) is the value measured by the method of JIS K7373.

EXAMPLES

Exemplary modes of the invention will now be further illustrated using Examples, with the understanding that the invention is not limited to these Examples. The main values for the physical properties were measured by the following methods.

<Tensile Strength>

An injection molding machine was used for molding of a multipurpose test piece conforming to ISO294-1, from the obtained molded article in the form of pellets. The tensile yield strength of the obtained multipurpose test piece was measured according to ISO527-1. The maximum strength was used instead for molded pieces that tore before reaching the yield point.

<Molding Shrinkage and Mold Shrinkage Ratio>

The obtained molded article in the form of pellets was molded into 60 mm×60 mm×2 mm and 60 mm×80 mm×2 mm flat plates using an injection molding machine, according to JIS K7152-3. A 60 mm×60 mm×2 mm flat plate was used for Examples 1 to 21 and Comparative Examples 1 to 5, and a 60 mm×80 mm×2 mm flat plate was used for Example 22 and Comparative Examples 6 and 7. The dimensions of the flat molded piece were accurately measured in the resin flow direction (MD) and the direction perpendicular to the flow direction (TD), according to ISO294-4, and the shrinkage factor was calculated. The shrinkage factor in the TD direction was divided by the shrinkage factor in the MD direction to calculate the mold shrinkage ratio.

<Yellowness Index Change ΔYI>

The flat plate molded for measurement of the mold shrinkage was used for measurement of the yellowness index according to JIS K7373. The difference between the value of the yellowness index (YI) of the obtained resin molded body compared to the value of the yellowness index (YI) of the auxiliary supply material during this time was calculated as the change in yellowness index (ΔYI).

<Warping of Flat Plate>

Using an injection molding machine, the obtained molded article in the form of pellets was molded into a flat plate with a width of 50 mm, a length of 70 mm and a thickness of 1 mm, and having a 1-mm diameter pinpoint gate. The die temperature during this time was adjusted to 25° C. On a smooth surface, with the warped convex section of the obtained flat molded piece oriented downward, the gate side was pressed against the surface and the gap between the molded piece and smooth surface on the opposite side was measured. The gap was measured by capturing it in a photograph. Measurement was conducted for at least five flat plates, and the value for warping was calculated as the average of 3 points excluding the maximum and minimum.

<Number of Large Aggregated Masses>

The obtained molded article in the form of pellets was cut with a microtome in the direction perpendicular to the flow, and the smooth surface was shaved and photographed using an optical microscope (BX53M: product of Olympus Corp.). The molded pellets were photographed at three points. The obtained photographs were binarized using an image analyzer and the total number with a circle equivalent diameter of 5 μm or larger was calculated.

<Materials Used>
Thermoplastic Resin (A)
Polyamide 6 ("PA6")
UBE Nylon 1013B: product of Ube Industries, Ltd.
Viscosity number: 120
Carboxy-terminal group ratio: ([COOH]/[total terminal groups])=0.6
Polypropylene ("PP")
NOVATEC PP MA1B (product of Japan Polypropylene Corp.)
MFR (230° C., 21.2 N load)=21 g/10 min
Cellulose nanofibers (B) ("CNF")
CNF without acetyl substitution and three types of CNF with different degrees of substitution were prepared according to the following Preparation Examples.

Preparation Example 1

(Defibrating step)

Linter pulp was cut and stirred for 1 hour at ordinary temperature, 500 rpm in a uniaxial stirrer (DKV-1 φ125 mm Dissolver by Aimex Co.), in dimethyl sulfoxide (DMSO). The mixture was then fed to a bead mill (NVM-1.5 by Aimex Co.) using a hose pump and circulated for 120 minutes, to obtain a defibrated CNF slurry.

The rotational speed of the bead mill during circulation was 2500 rpm, and the circumferential speed was 12 m/s. The beads used were zirconia, φ2.0 mm, and the fill factor was 70% (with a slit gap of 0.6 mm in the bead mill). Also during the circulation, the slurry temperature was controlled to 40° C. with a chiller, for absorption of the heat release by abrasion.

When the defibrated CNF properties were evaluated, the diameter was 65 nm and the L/D was approximately 450.
(Acetylation Step)

After adding 11 parts by mass of vinyl acetate and 1.63 parts by mass of sodium hydrogencarbonate to 100 parts by mass of the defibrated CNF slurry obtained in the defibrating step, in a bead mill apparatus, the mixture was circulated to obtain an acetylated CNF slurry. The circulation conditions were the same as in the defibrating step. The circulating operation time was 30 minutes, 60 minutes or 120 minutes, to obtain acetylated CNF slurries with different degrees of substitution.

The degree of substitution of each CNF obtained under the different conditions was measured to be 0.50 for the one with a circulation time of 30 minutes, 1.02 for the one with a circulation time of 60 minutes and 1.49 for the one with a circulation time of 120 minutes.
(Water Displacement Step)

After adding 192 parts by mass of purified water to 100 parts by mass of the obtained defibrated CNF slurry or the acetylated CNF slurry and thoroughly stirring the mixture, it was placed in a dehydrator for dehydration and concentration to obtain a wet cake. The obtained wet cake was then re-dispersed in the same amount of purified water and stirred and concentrated, and this rinsing procedure was repeated a total of 5 times for solvent replacement.
(Drying Step)

The defibrated CNF wet cake and each acetylated CNF wet cake was adjusted in concentration with purified water to a cellulose solid concentration of 10 mass %, and then 5 parts by mass of PEG 20,000 was added to 100 parts by mass of CNF, the mixture was thoroughly stirred, and a revolving/rotating stirrer (V-mini300k by EME Co.) was used for vacuum drying at about 40° C. to obtain different CNF dry powders.

<Apparatus>
<Melt Mixer>

Using a codirectional rotation twin-screw extruder (TEM26SX: product of Toshiba Machine Co., Ltd.) with L/D=60 having 15 temperature-controlled barrels with L/D=4, a material-feeding throat (hereunder referred to simply as "throat") was provided for "barrel 1", as the barrel furthest upstream in the extruder, side feeding apparatuses for feeding of the starting materials were provided for barrel 4 and barrel 7 (the side feed to barrel 4 will hereunder be referred to simply as "side 1" and the side feed to barrel 7 as "side 2"), and a volatilizing decompression port was provided for barrel 14.

The screw design was a design with placement of "clockwise screw (RS)" at the locations of L/D=0 to 18 (barrel 1 to center of barrel 5), placement of two "clockwise kneading discs (RKD)", three "neutral kneading discs (NKD)" and one "counter-clockwise kneading disc (LKD)" in that order at the locations of L/D=19 to 24 (center of barrel 5 to barrel 6), placement of RS at the locations of L/D=24 to 32 (barrel 7 to barrel 8), placement of one RKD, two NKD, one RKD and two NKD in that order at the locations of L/D=32 to 36 (barrel 9), placement of RS at the locations of L/D=36 to 40 (barrel 10), placement of one RKD, two NKD, one RKD and three NKD in that order at the locations of L/D=40 to 44 (barrel 11), placement of RS at the location of L/D=44 to 48 (barrel 12), placement of two NKD, one LKD, three NKD and one "counter-clockwise screw (LS)" in that order at the locations of L/D=48 to 52 (barrel 13), placement of RS at the locations of L/D=52 to 56 (barrel 14), and placement of one RS and three NKD in that order at the locations of L/D=56 to 60 (barrel 13), and with the remainder all RS.

A die with two 3 mm-diameter spinnerets was set at the front end of the extruder, allowing extrusion of the molten resin into the form of a strand.
<Molding Apparatus>

The molten strand was cooled in a water tank provided after the melt mixer, and then cut into pellets using a pelletizer to obtain resin molded body pellets. Some of the obtained resin molded body pellets were used as an auxiliary supply material. (The auxiliary supply material form will hereunder be referred to as "pellets").

The obtained resin molded body pellets were also molded using an injection molding machine (TR05EH2 by Sodick Plustech Co., Ltd., 5 ton locking pressure), with an FPC connector (length: 30 mm, width: 1 mm, 2 impressions, 50 pinholes, pinhole pitch: 0.5 millimeter pitch) die at an injection speed of 300 mm/sec, to obtain a connector-type resin molded body. The connector-type molded article was pulverized using a pulverizer and adjusted to a diameter of mm using a mesh to obtain a pulverized auxiliary supply material. (This auxiliary supply material form will hereunder be referred to as "pulverized product").

Preparation Example 2

Melt mixing was carried out with the barrel temperature of the melt mixer set to 150° C. for barrels 1 to 3 and 250° C. for barrels 4 to 15 and the die, and with supply from the throat section at 60 mass % of PA6 and 40 mass % of CNF having a degree of substitution of 1.02, to obtain high-concentration PA/CNF pellets (hereunder referred to simply as "PA/CNFMB"). The rotational speed of the screw of the melt mixer was 300 rpm, and the throughput was 18 kg/hr.

Preparation Example 3

Melt mixing was carried out in the same manner as Preparation Example 2, except that the melt mixer barrel temperature was set to 100° C. for barrels 1 to 3 and to 200° C. for barrels 4 to 15 and the die, and PA6 was changed to PP, to obtain high-concentration PP/CNF pellets (hereunder referred to simply as "PP/CNF-MB").

Examples 1 to 16, Comparative Examples 1 to 5

The main supply material was supplied from the main supply material addition location, with the barrel temperature of the melt mixer set to 150° C. for barrels 1 to 3, to 260° C. for barrels 4 to 7 and to 250° C. for barrels 8 to 15 and the die, and with the compositions listed in Table 1 and Table 2 for the main supply material, while the auxiliary supply material, as a molten mixture of the main supply material, was supplied from the auxiliary supply material addition location, and they were melt mixed to obtain resin molded body pellets which were evaluated for different properties as shown in Tables 1 and 2. The rotational speed of the screw of the melt mixer was 300 rpm, and the throughput was 25 kg/hr.

The "processes" listed in the tables are processes 100, 200, 300 and 400 which were referred to in explaining the present embodiment.

The pellets of Comparative Example 1 were used for the auxiliary supply material in Examples 1 to 11 (auxiliary supply material 12 in the process flow). The pellets of Comparative Example 3 were used for the auxiliary supply material in Example 12 (auxiliary supply material 12 in the process flow), and the pellets of Comparative Example 5 were used as the auxiliary supply material in Example 13.

The pulverized product of the auxiliary supply material used in Example 6 was obtained by molding the obtained resin molded body pellets into a connector-type resin molded body and then pulverizing it.

The main supply material of Example 9 was PA6 supplied from the throat section and CNF supplied from the side 1. By supplying the materials separately, an unexpected effect was obtained of lower variation in tensile strength between test pieces, presumably because rising during supply of the CNF powder was reduced and the supply was stabilized.

Comparative Examples 1, 3 and 5 were Examples where no auxiliary supply material was added. Comparative Examples 2, 4, 6 and 7 are Examples without the main supply material, i.e. with the auxiliary supply material alone, and they correspond to 100% recirculation (recycling).

TABLE 1

| | | | Comp. Example 1 | Example 1 | Example 2 | Example 3 | Example 4 | Example 5 | Comp. Example 2 |
|---|---|---|---|---|---|---|---|---|---|
| Main supply material composition | PA6 | mass % | 90 | 90 | 90 | 90 | 90 | 90 | 90 |
| | PA/CNFMB | mass % | | | | | | | |
| | CNF | mass % | 10 | 10 | 10 | 10 | 10 | 10 | 10 |
| | CNF degree of substitution | — | 1.02 | 1.02 | 1.02 | 1.02 | 1.02 | 1.02 | 1.02 |
| Main supply material | | mass % | 100 | 95 | 90 | 75 | 50 | 40 | 0 |
| Auxiliary supply material | | mass % | 0 | 5 | 10 | 25 | 50 | 60 | 100 |
| Process | | | 100 | 100 | 100 | 100 | 100 | 100 | 100 |
| Main supply material addition location | | | Throat | Throat | Throat | Throat | Throat | Throat | — |
| Secondary supply material addition location | | | — | Throat | Throat | Throat | Throat | Throat | Throat |
| Auxiliary supply material form | | | — | — | Pellets | Pellets | Pellets | Pellets | Pellets | Pellets |
| Tensile strength | | MPa | 82 | 95 | 111 | 127 | 119 | 94 | 80 |
| Molding shrinkage (MD) | | % | 0.09 | 0.25 | 0.39 | 0.4 | 0.42 | 0.46 | 0.46 |
| Molding shrinkage (TD) | | % | 0.87 | 0.7 | 0.56 | 0.55 | 0.53 | 0.49 | 0.48 |
| Mold shrinkage ratio (TD/MD) | | — | 9.67 | 2.80 | 1.44 | 1.38 | 1.26 | 1.07 | 1.04 |
| ΔYI | | — | — | 1.1 | 1.9 | 4.8 | 10.6 | 12.3 | 16.5 |
| Warping during flat plate molding | | mm | 0.51 | 0.26 | Essentially none | Essentially none | Essentially none | Essentially none | Essentially none |
| Number of aggregates | | Number | 463 | 152 | 125 | 86 | 75 | 78 | 73 |

| | | | Example 6 | Example 7 | Example 8 | Example 9 | Example 10 | Example 11 |
|---|---|---|---|---|---|---|---|---|
| Main supply material composition | PA6 | mass % | 90 | 90 | 90 | 90 | 60 | 60 |
| | PA/CNFMB | mass % | | | | | 40 | 40 |
| | CNF | mass % | 10 | 10 | 10 | 10 | | |
| | CNF degree of substitution | — | 1.02 | 1.02 | 1.02 | 1.02 | 1.02 | 1.02 |
| Main supply material | | mass % | 90 | 75 | 75 | 75 | 75 | 75 |
| Auxiliary supply material | | mass % | 10 | 25 | 25 | 25 | 25 | 25 |
| Process | | | 100 | 100 | 200 | 300 | 400 | 400 |
| Main supply material addition location | | | Throat | Throat | Side 2 | Throat Side 1 | Throat | Throat |
| Secondary supply material addition location | | | Throat | Side 2 | Throat | Side 2 | Throat | Side 2 |
| Auxiliary supply material form | | | Pulverized product | Pellets | Pellets | Pellets | Pellets | Pellets |
| Tensile strength | | MPa | 108 | 123 | 133 | 129 | 139 | 136 |
| Molding shrinkage (MD) | | % | 0.41 | 0.37 | 0.41 | 0.38 | 0.43 | 0.41 |
| Molding shrinkage (TD) | | % | 0.54 | 0.57 | 0.55 | 0.56 | 0.53 | 0.54 |
| Mold shrinkage ratio (TD/MD) | | | 1.32 | 1.54 | 1.34 | 1.47 | 1.23 | 1.32 |
| ΔYI | | — | 2.5 | 4.4 | 3.2 | 4.5 | 5.2 | 5.0 |
| Warping during flat plate molding | | mm | Essentially none | Essentially none | Essentially none | Essentially none | Essentially none | Essentially none |
| Number of aggregates | | Number | 131 | 92 | 61 | 88 | 30 | 35 |

TABLE 2

| | | | Comparative Example 3 | Example 12 | Comparative Example 4 | Comparative Example 5 | Example 13 | Example 14 | Example 15 | Example 16 |
|---|---|---|---|---|---|---|---|---|---|---|
| Main supply material composition | PA6 | mass % | 80 | 80 | 80 | 70 | 70 | 70 | 70 | 70 |
| | CNF | mass % | 20 | 20 | 20 | 30 | 30 | 30 | 30 | 30 |
| | CNF degree of substitution | — | 1.02 | 1.02 | 1.02 | 1.02 | 1.02 | 0 | 0.5 | 1.49 |
| Main supply material | | mass % | 100 | 90 | 0 | 100 | 90 | 90 | 90 | 90 |
| Auxiliary supply material | | mass % | 0 | 10 | 100 | 0 | 10 | 10 | 10 | 10 |
| Process | | | 100 | 100 | 100 | 100 | 100 | 100 | 100 | 100 |
| Main supply material addition location | | | Throat | Throat | — | Throat | Throat | Throat | Throat | Throat |
| Secondary supply material addition location | | | — | Throat | Throat | — | Throat | Throat | Throat | Throat |
| Auxiliary supply material form | | | — | — | Pellets | Pellets | — | Pellets | Pellets | Pellets | Pellets |
| Tensile strength | | MPa | 88 | 125 | 91 | 94 | 136 | 86 | 115 | 98 |
| Molding shrinkage (MD) | | % | 0.08 | 0.28 | 0.41 | 0.05 | 0.21 | 0.18 | 0.22 | 0.25 |
| Molding shrinkage (TD) | | % | 0.78 | 0.58 | 0.45 | 0.73 | 0.57 | 0.58 | 0.55 | 0.53 |
| Mold shrinkage ratio (TD/MD) | | — | 9.75 | 2.07 | 1.10 | 14.60 | 2.71 | 3.22 | 2.50 | 2.12 |
| ΔYI | | | — | — | 3.2 | 23.1 | — | 4.5 | 26.5 | 13.9 | 2.2 |
| Warping during flat plate molding | | mm | 0.42 | 0.13 | Essentially none | 0.53 | 0.16 | 0.26 | 0.15 | 0.12 |
| Number of aggregates | | Number | 659 | 198 | 169 | 1046 | 221 | 787 | 653 | 295 |

Examples 17 to 21

These Examples were carried out in the same manner as Example 10 except that the barrel temperature of the melt mixer was set to 100° C. for barrels 1 to 3, to 200° C. for barrels 4 to 7 and to 190° C. for barrels 8 to 15 and the die and the composition and conditions were changed as shown in Table 3, and the properties were evaluated. The results are listed in Table 3.

TABLE 3

| | | | Example 17 | Example 18 | Example 19 | Example 20 | Example 21 |
|---|---|---|---|---|---|---|---|
| Main supply material composition | PP | mass % | 60 | 60 | 60 | 60 | 60 |
| | PP/CNFMB | mass % | 40 | 40 | 40 | 40 | 40 |
| | CNF degree of substitution | — | 1.02 | 1.02 | 1.02 | 1.02 | 0.5 |
| Main supply material | | mass % | 95 | 90 | 75 | 50 | 75 |
| Auxiliary supply material | | mass % | 5 | 10 | 25 | 50 | 25 |
| Process | | | 400 | 400 | 400 | 400 | 400 |
| Main supply material addition location | | | Throat | Throat | Throat | Throat | Throat |
| Secondary supply material addition location | | | Throat | Throat | Throat | Throat | Throat |
| Auxiliary supply material form | | | Pellets | Pellets | Pellets | Pellets | Pellets |
| Tensile strength | | MPa | 65 | 83 | 100 | 73 | 86 |
| Molding shrinkage (MD) | | % | 0.12 | 0.31 | 0.41 | 0.51 | 0.38 |
| Molding shrinkage (TD) | | % | 1.1 | 0.91 | 0.79 | 0.71 | 0.83 |
| Mold shrinkage ratio (TD/MD) | | — | 9.17 | 2.94 | 1.93 | 1.39 | 2.18 |
| ΔYI | | | — | 0.8 | 2.5 | 10.5 | 13.1 |
| Warping during flat plate molding | | mm | 0.38 | ≤0.1 | Essentially none | Essentially none | Essentially none |
| Number of aggregates | | Number | 2560 | 562 | 232 | 229 | 253 |

Example 22, Comparative Example 6,7

These Examples were carried out in the same manner as Example 1, except that the discharge throughput in the melt mixer was 10 kg/hr and the composition and conditions were changed as shown in Table 4, and the properties were evaluated. The results are listed in Table 4. Comparative Examples 6 and 7 are Examples with the auxiliary supply material alone, and they correspond to 100% recirculation (recycling). Comparative Example 7 was treated twice by the process 100.

TABLE 4

|  |  |  | Example 22 | Comparative Example 6 | Comparative Example 7 |
|---|---|---|---|---|---|
| Main supply material composition | PA6 | mass % | 96 | 96 | 96 |
|  | PA/CNFMB | mass % |  |  |  |
|  | CNF | mass % | 4 | 4 | 4 |
|  | CNF degree of substitution | — | 1.02 | 1.02 | 1.02 |
| Main supply material |  | mass % | 95 | 0 | 0 |
| Auxiliary supply material |  | mass % | 5 | 100 | 100 |
| Process |  |  | 100 | 100 | 100 × 2 |
| Main supply material addition location |  |  | Throat | — | — |
| Secondary supply material addition location |  |  | Throat | Throat | Throat |
| Auxiliary supply material form |  | — | Pellets | Pellets | Pellets |
| Tensile strength |  | MPa | 90 | 81 | 78 |
| Molding shrinkage (MD) |  | % | 0.99 | 0.98 | 0.95 |
| Molding shrinkage (TD) |  | % | 1.18 | 1.01 | 1.04 |
| Mold shrinkage ratio (TD/MD) |  | — | 1.19 | 1.03 | 1.01 |
| ΔYI |  | — | 0.8 | 1.1 | 1.5 |
| Warping during flat plate molding |  | mm | Essentially none | Essentially none | Essentially none |
| Number of aggregates |  | Number | 82 | 51 | 39 |

In Comparative Examples 6 and 7, the tensile strength was notably reduced and inferior.

INDUSTRIAL APPLICABILITY

The method for producing a resin molded body according to the present invention can be suitably applied for production of resin molded bodies to be used for purposes that require satisfactory mechanical strength and low anisotropy of physical properties.

REFERENCE SIGNS LIST

100, 200, 300, 400 Process
101, 401 Melt mixer
102, 402 Molding unit
11, 41 Main supply material
11a Thermoplastic resin (A)
11b Cellulose nanofibers (B)
11c Optional additional component
12, 42 Auxiliary supply material
13, 43 Resin composition
14, 44 Resin molded body
41a First material
41b Second material
S1, S1a, S1b, S1c Main supply material-loading site
S2 Auxiliary supply material-loading site
S3 Mixing completion site
S4 Delivery site
S5 Separating site

The invention claimed is:

1. A method for producing a resin molded body that includes a thermoplastic resin (A) and cellulose nanofibers (B), wherein the method includes:
 a step of preparing a main supply material (a1) that includes the thermoplastic resin (A) and the cellulose nanofibers (B), and an auxiliary supply material (a2) which is the product of melting treatment of the main supply material (a1), and
 a resin composition-forming step of melt mixing the main supply material (a1) and the auxiliary supply material (a2) to obtain a resin composition (b), and
 a step of molding the resin composition (b) to obtain a resin molded body,
wherein the melt mixing is carried out with the blending ratio of the auxiliary supply material (a2) at 5 to 50 mass % with respect to 100 mass % as the total of the main supply material (a1) and the auxiliary supply material (a2).

2. A method for increasing defibration of cellulose nanofibers (B) during production of a resin molded body that includes a thermoplastic resin (A) and cellulose nanofibers (B), wherein the method includes:
 a step of preparing a main supply material (a1) that includes the thermoplastic resin (A) and the cellulose nanofibers (B), and an auxiliary supply material (a2) which is the product of melting treatment of the main supply material (a1), and
 a resin composition-forming step of melt mixing the main supply material (a1) and the auxiliary supply material (a2) to obtain a resin composition (b) that includes two or more types of cellulose nanofibers with different thermal histories, and
 a step of molding the resin composition (b) to obtain a resin molded body,
wherein the melt mixing is carried out with the blending ratio of the auxiliary supply material (a2) at 5 to 50 mass % with respect to 100 mass % as the total of the main supply material (a1) and the auxiliary supply material (a2).

3. The method according to claim 2, wherein the two or more types of cellulose nanofibers with different thermal histories have different fiber lengths.

4. The method according to claim 1, wherein a portion of the resin molded body is used as the auxiliary supply material (a2).

5. The method according to claim 1, wherein the main supply material (a1) includes the thermoplastic resin (A) at 100 parts by mass and the cellulose nanofibers (B) at 1 to 50 parts by mass.

6. The method according to claim 1, wherein the constituent components of the main supply material (a1) are mixed together and with the auxiliary supply material (a2) in a melt mixing system.

7. The method according to claim 1, wherein the main supply material (a1) is a combination of a first material as a molded article that includes the thermoplastic resin (A) at 100 parts by mass and the cellulose nanofibers (B) at 1 to 50 parts by mass, and a second material with a different composition than the first material.

8. The method according to claim 1, wherein the melt mixing is melt kneading.

9. The method according to claim 1, wherein the resin molded body is in the form of pellets.

10. The method according to claim 9, wherein the melt mixing is melt kneading, and the melt kneading and molding are carried out in a single kneader.

11. A method for producing a resin molded body that includes a thermoplastic resin (A) and cellulose nanofibers (B), wherein the method includes:
- a step of preparing a main supply material (a1) that includes the thermoplastic resin (A) and the cellulose nanofibers (B), and an auxiliary supply material (a2) which is the product of melting treatment of the main supply material (a1), and
- a resin composition-forming step of melt mixing the main supply material (a1) and the auxiliary supply material (a2) to obtain a resin composition (b), and
- a step of molding the resin composition (b) to obtain a resin molded body,
- wherein the TD/MD ratio for molding shrinkage of the resin molded body is 1.05 to 3.0.

12. The method according to claim 1, wherein in the resin molded body, the molding shrinkage in the MD direction is 0.2% to 0.7% and the molding shrinkage in the TD direction is 0.5% to 1.0%.

13. The method according to claim 1, wherein the resin molded body has a tensile strength of 90 MPa or greater.

14. The method according to claim 1, wherein the method further includes returning a portion of the resin molded body back to the resin composition-forming step as at least part of the auxiliary supply material (a2), so that the resin molded body includes cellulose nanofibers that have passed through melting treatment of the main supply material (a1) and at least two resin composition-forming steps, and
the percentage of the cellulose nanofibers that have passed through melting treatment of the main supply material (a1) and at least two resin composition-forming steps is 20 mass % or lower with respect to 100 mass % as the total amount of the cellulose nanofibers in the resin molded body.

15. The method according to claim 1, wherein the difference between the value of the yellowness index (YI) of the resin molded body and the value of the yellowness index (YI) of the auxiliary supply material is 10 or less.

16. The method according to claim 1, wherein the thermoplastic resin (A) is a polyamide.

17. The method according to claim 1, wherein the cellulose nanofibers (B) are modified cellulose nanofibers.

18. The method according to claim 17, wherein the degree of substitution of the modified cellulose nanofibers is 0.5 to 1.5.

19. A method for increasing defibration of cellulose nanofibers (B) during production of a resin molded body that includes a thermoplastic resin (A) and cellulose nanofibers (B), wherein the method includes:
- a step of preparing a main supply material (a1) that includes the thermoplastic resin (A) and the cellulose nanofibers (B), and an auxiliary supply material (a2) which is the product of melting treatment of the main supply material (a1), and
- a resin composition-forming step of melt mixing the main supply material (a1) and the auxiliary supply material (a2) to obtain a resin composition (b) that includes two or more types of cellulose nanofibers with different thermal histories, and
- a step of molding the resin composition (b) to obtain a resin molded body, wherein the TD/MD ratio for molding shrinkage of the resin molded body is 1.05 to 3.0.

* * * * *